(12) United States Patent
Sueoka et al.

(10) Patent No.: US 7,488,259 B2
(45) Date of Patent: Feb. 10, 2009

(54) RESIN BOOTS FOR CONSTANT VELOCITY UNIVERSAL JOINT

(75) Inventors: Kazuhiko Sueoka, Ageo (JP); Yasuji Takada, Ageo (JP)

(73) Assignee: Fukoku Co., Ltd., Saitama (JP)

( * ) Notice: Subject to any disclaimer, the term of this patent is extended or adjusted under 35 U.S.C. 154(b) by 0 days.

(21) Appl. No.: 11/220,727

(22) Filed: Sep. 8, 2005

(65) Prior Publication Data

US 2006/0068925 A1    Mar. 30, 2006

Related U.S. Application Data

(63) Continuation-in-part of application No. 10/396,520, filed on Mar. 26, 2003.

(30) Foreign Application Priority Data

Feb. 19, 2003   (JP) ............................... 2003-041317

(51) Int. Cl.
*F16D 3/84*   (2006.01)
(52) U.S. Cl. ....................... 464/175; 464/905
(58) Field of Classification Search ................ 464/111, 464/905, 173–175; 277/634–636
See application file for complete search history.

(56) References Cited

U.S. PATENT DOCUMENTS

| | | | |
|---|---|---|---|
| 4,786,270 A * | 11/1988 | Iwasaki | ........................ 464/111 |
| 5,236,656 A | 8/1993 | Nakajima | |
| 5,529,538 A | 6/1996 | Schulz et al. | |
| 6,171,534 B1 | 1/2001 | Leach et al. | |
| 6,660,206 B1 | 12/2003 | Matsushima et al. | |
| 6,695,706 B2 | 2/2004 | Furuta | |
| 6,832,763 B2 | 12/2004 | Huchet et al. | |
| 2002/0043772 A1* | 4/2002 | Huchet et al. | ............... 277/634 |

(Continued)

FOREIGN PATENT DOCUMENTS

EP    0924450 A2   6/1999

(Continued)

OTHER PUBLICATIONS

Catalogue, "Constant Velocity Universal Joints or Automobiles", No. 5601-II/JE, p. 9, issue Feb. 3, 2000 by NTN Co., Ltd.

(Continued)

*Primary Examiner*—Greg Binda
(74) *Attorney, Agent, or Firm*—Rader, Fishman & Grauer, PLLC

(57) ABSTRACT

A resin boots for constant velocity universal joint, including: a resin bellows including an approximately conical bellows-shaped portion with its inner hollow part, a small diameter end portion communicated with an inner space of the bellows-shaped portion and arranged at one end, and a large diameter side end portion communicated with the inner space of the bellows-shaped portion and arranged at the other end; a large thickness portion formed in an inner surface of a large diameter side end portion of the resin bellows in accordance with an injection molding, protruded in the vertical direction to the center of the large diameter side end portion and arranged in the circumferential direction at regular intervals; and a small thickness portion arranged between the large thickness portions and formed thinner in the diametrical direction compared with large thickness portion.

3 Claims, 16 Drawing Sheets

U.S. PATENT DOCUMENTS

2002/0160074 A1 10/2002 Saito et al.
2005/0046077 A1 3/2005 Sueoka et al.
2005/0046078 A1 3/2005 Sueoka et al.

FOREIGN PATENT DOCUMENTS

| EP | 0924450 A3 | 6/1999 |
|---|---|---|
| JP | 2-22463 | 2/1990 |
| JP | 2002-286048 | 10/2002 |

OTHER PUBLICATIONS

Rosato, Dominick V., Donald V. Rosato, and Marlene G. Rosato, Injection Molding Handbook (3rd edition). Boston: Kluwer Academic Publishers, 2000. pp. 289, 334, 1252-1253, 1257.

* cited by examiner

RESIN BOOTS FOR CONSTANT VELOCITY UNIVERSAL JOINT

DESCRIPTION OF THE RELATED APPLICATION

The present application is a CIP application of the U.S. patent application Ser. No. 10/396,520 which was filed on Mar. 26, 2003.

BACKGROUND OF THE INVENTION

1. Field of the Invention

The present invention relates to a resin boot for constant velocity universal joint used in a state of being firmly fixed to an outer peripheral surface of a tripod joint, an outer periphery of which is formed in a convex-recess shape, in a constant velocity universal joint, for example, used in a drive shaft and a propeller shaft for transmitting a power from an engine of a motor vehicle to a tire.

2. Description of the Related Art

The tripod joint has recess portions formed in desired portions on the outer peripheral surface for various purposes such as reduction in thickness, reduction in weight and the like.

In the resin boot for constant velocity universal joint used in a state of being firmly fixed to the outer peripheral surface of the constant velocity universal joint, a bellows-shaped portion thereof plays a part in a cover and also a part in bending in correspondence to a motion of the drive shaft, the propeller shaft or the like, and an end portion thereof is firmly fixed to the outer periphery of the constant velocity universal joint via a band and plays a part in an oil (grease) seal and dust seal.

Accordingly, it is necessary to form an inner periphery of the end portion of the boots in a shape closely attached so as to be aligned with the outer periphery of the tripod joint (a joint outer race or the like), and since the tripod joint has the recess portions formed in the outer periphery thereof as described above, it is necessary that the end portion in a large diameter side firmly fixed to the outer periphery be formed to have an inner periphery having a different thickness portion.

In the past, as a boot for constant velocity universal joint used for a tripod joint, there is known a boot having a structure as shown in FIG. 24 and FIG. 25 (for example, refer to Catalogue "Constant Velocity Universal Joints or Automobiles" (CAT. No. 5601-II/JE) page 9, issued on Feb. 3, 2000 by NTN Co., Ltd).

According to the structure of the related art, the boot includes a resin bellows 100 which is formed, for example, by an injection blow molding and has a large diameter side end portion 101, having a uniform thickness, and a rubber grommet 200 which has an outer diameter fitted to an inner surface of the large diameter side end portion 101 of the resin bellows 100, is formed in a circular ring shape, and has thickness portions 201 protruding in an inner diameter direction every fixed intervals. An outer periphery of the grommet 200 independently formed as mentioned above is fit to the inner periphery of the large diameter side end portion 101 of the bellows 100. An inner periphery of the grommet 200 is fit to an outer periphery of the tripod joint 80. The boot is fastened and firmly fixed to the outer periphery of the tripod joint 80 from the outer peripheral side of the large diameter side end portion 101 by a fastening device such as a band 300 or the like.

Further, in the past, a resin grommet having thickness portions protruding in an inner diameter direction every fixed intervals is previously formed, the grommet is held within a metal mold and thereafter injection molding or blow molding of a resin bellows is executed, to thereby integrate the grommet and the bellows within the metal mold (for example, refer to Japanese Unexamined Utility Model Registration Application Publication No. 2-22463 and Japanese Unexamined Patent Publication No. 2002-286048).

However, when assembling the boot having the structure in FIG. 24 and FIG. 25 above in which the bellows 100 and the grommet 200 are independently formed and are fitted and assembled, there is a fear in that a grease may leak. That is, if the fitting operation is carelessly carried out at a time of fitting the grommet 200 to the inner periphery of the bellows large diameter side end portion 101, a displacement is generated between both elements. Alternatively, it is possible to outward fit the bellows large diameter side end portion 101 after fitting the grommet 200 to the outer periphery of the tripod joint 80, however, there is a fear in that a displacement may be generated between the bellows large diameter side end portion 101 and the grommet 200, thereby generating grease leakage.

Further, in Japanese Unexamined Utility Model Registration Application Publication No. 2-22463 and Japanese Unexamined Patent Publication No. 2002-286048, no specific technical means is provided in integrally forming the grommet and the bellows, so the both elements are not securely welded even if they are integrally formed on the surface. Accordingly, the portion which is expected to be integrally formed peels off, with the result that there is generated a problem such as grease leakage.

SUMMARY OF THE INVENTION

The inventors have paid attention to a dichroic molding, and have succeeded in developing a resin boot for constant velocity universal joint in which a different thickness portion including thick and thin portions is secondarily formed by injection molding on the inner or outer surface of the large diameter side end portion of the resin bellows which is previously formed in primary molding.

The present invention is made in view of the above, and there is a need to provide a resin boot for constant velocity universal joint in which a different thickness portion including large thickness portions and small thickness portions are welded and integrated in an inner or outer surface of a large diameter side end portion of a primarily molded resin bellows by injection molding.

According to a first aspect of the invention, a resin boots for constant velocity universal joint includes:

a resin bellows including an approximately conical bellows-shaped portion with an inner hollow space, a small diameter end portion communicated with the inner space of the bellows-shaped portion and arranged at one end thereof, and a large diameter side end portion communicated with the inner space of the bellows-shaped portion and arranged at the other end thereof;

a different thickness portion including a plurality of large thickness portions protruded toward a central axis of the large diameter side end portion and arranged in a circumferential direction at approximately regular intervals and a plurality of small thickness portions, each arranged between the adjacent plurality of large thickness portions and formed thinner in a diametrical direction than the large thickness portions, and formed such that the plurality of large thickness portions and the plurality of small thickness portions are continuously formed in the circumferential direction; and an integrally welded portion between an inner surface of the large diameter side end portion of the resin bellows and the different thickness portion.

According to a second aspect of the invention, a small thickness portion molding space and a large thickness portion molding space are preferably formed in the inner surface of the large diameter side end portion of the resin bellows, and a molten material is injected into the small thickness portion molding space and the large thickness portion and the small thickness portion are welded and integrated with the inner surface of the large diameter side end portion.

According to a third aspect of the invention, the molten material is preferably injected into an approximately center in the circumferential direction of the small thickness portion molding space.

According to a fourth aspect of the invention, a resin boots for constant velocity universal joint includes:

a resin bellows including an approximately conical bellows-shaped portion with its inner hollowspace, a small diameter side end portion communicated with an inner space of the bellows-shaped portion and annularly arranged at one end thereof, and a large diameter side end portion communicated with the inner space of the bellows-shaped portion and arranged annularly at the other end thereof;

a different thickness portion including a plurality of large thickness portions protruded toward a central axis of the large diameter side end portion and arranged in a circumferential direction at approximately regular intervals and a plurality of small thickness portions, each arranged between the adjacent plurality of large thickness portions and formed thinner in a diametrical direction than the large thickness portions, and formed such that the plurality of large thickness portions and the plurality of small thickness portions are continuously formed in the circumferential direction; and an integrally welded portion between an inner surface of the large diameter side end portion of the resin bellows and the different thickness portion.

According to a fifth aspect of the invention, a small thickness portion molding space and a large thickness portion molding space are formed in the outer surface of the large diameter side end portion of the resin bellows, and a molten material is injected from the small thickness portion molding space and the large thickness portion and the small thickness portion are welded and integrated in the inner surface of the large diameter side end portion.

According to a sixth aspect of the invention, the molten material is injected into an approximate center in the circumferential direction of the small thickness portion molding space.

According to the above aspects of the present invention, there can be provided a resin boot for constant velocity universal joint in which different thickness portions including large thickness portions and small thickness portions are welded and integrated with the inner or outer surface of the large diameter side end portion of the resin bellow by injection molding, whereby it is possible to solve the problem of the grease leakage and, at the same time, improve an assembling operability.

Further, as for the resin boot for constant velocity universal joint in which the different thickness portion including large thickness portions and small thickness portions are welded and integrated with the outer surface of the large diameter side end portion of the resin bellow by secondary molding, a contact portion of the molten material from injected at the time of secondary molding cannot be seen, with the result that an excellent sealing effect is attained and grease does not leak.

DESCRIPTION OF THE PREFERRED EMBODIMENT

First Embodiment

A description will be given of one embodiment in accordance with the present invention with reference to the accompanying drawings. In this case, the present embodiment only shows one aspect of the present invention, and the present invention is not limited to this embodiment any more, and can be changed in design within the scope of the present invention as occasion demands.

Figure 1:
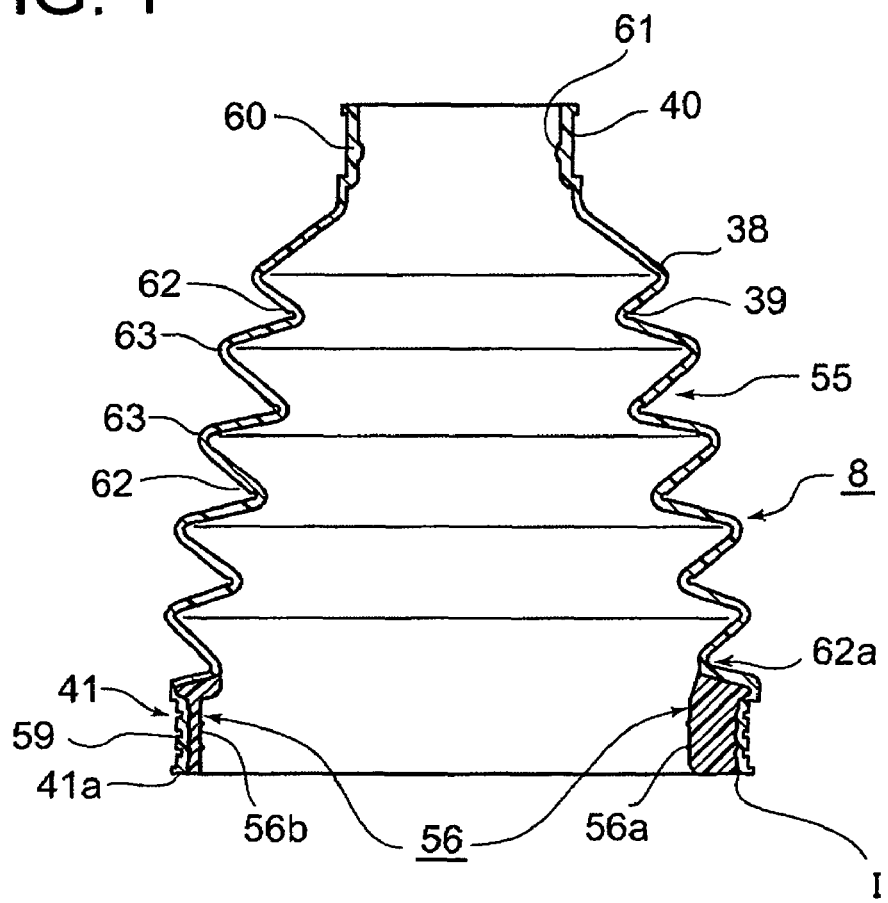
FIG. 1 is a vertical sectional view showing a resin boot for constant velocity universal joint in accordance with an embodiment of the present invention.
Figure 2:
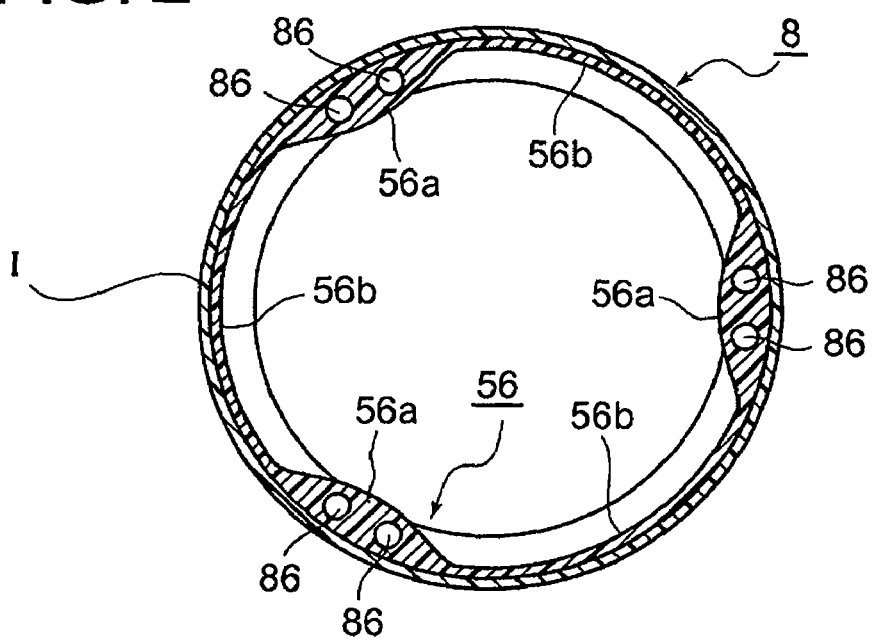
FIG. 2 is a cross-sectional view showing the resin boot for constant velocity universal joint in accordance with the embodiment of the present invention.
Figure 3:
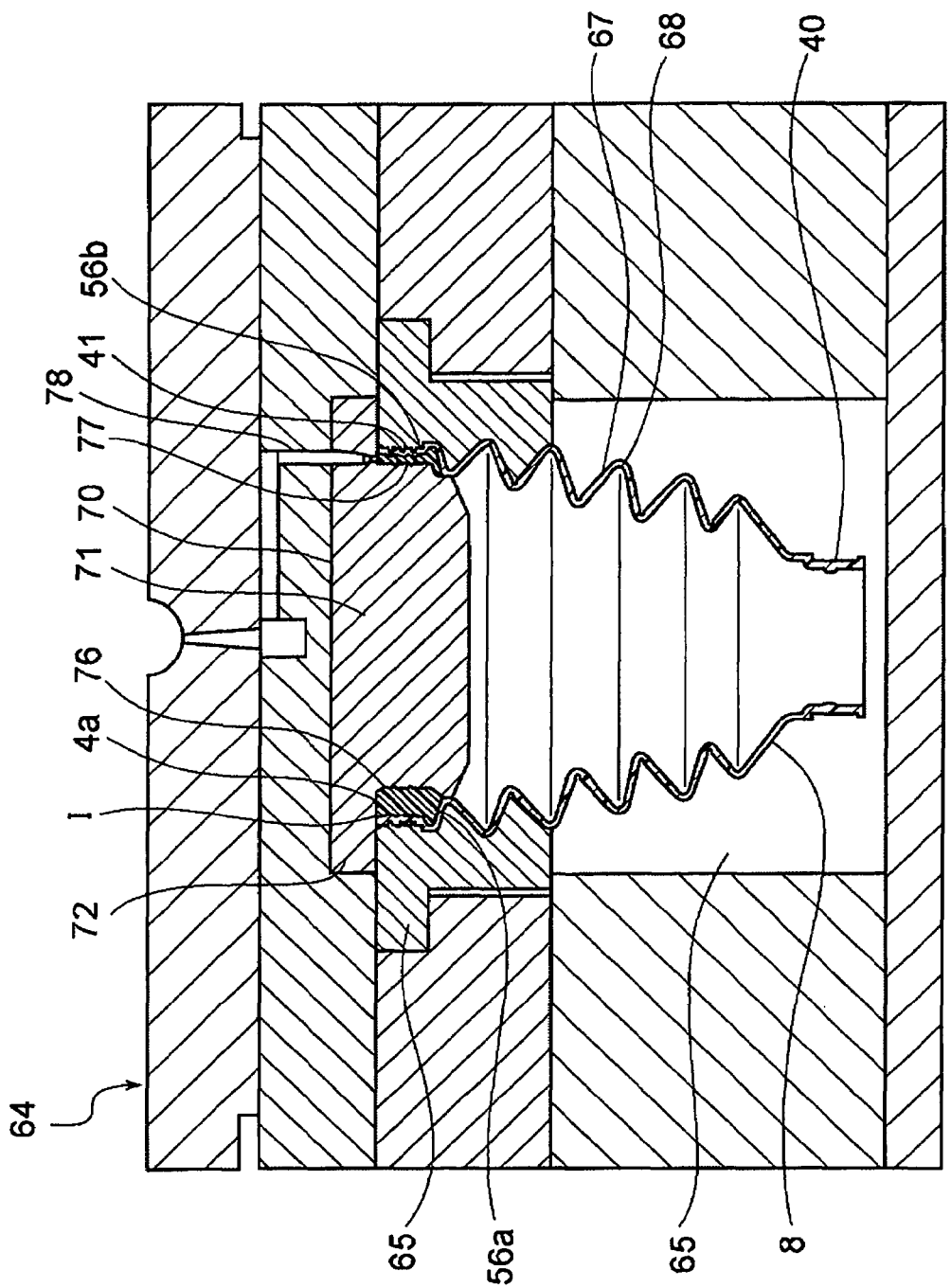
FIG. 3 is a simplified cross-sectional view showing a secondary molding step of this embodiment.
Figure 4:
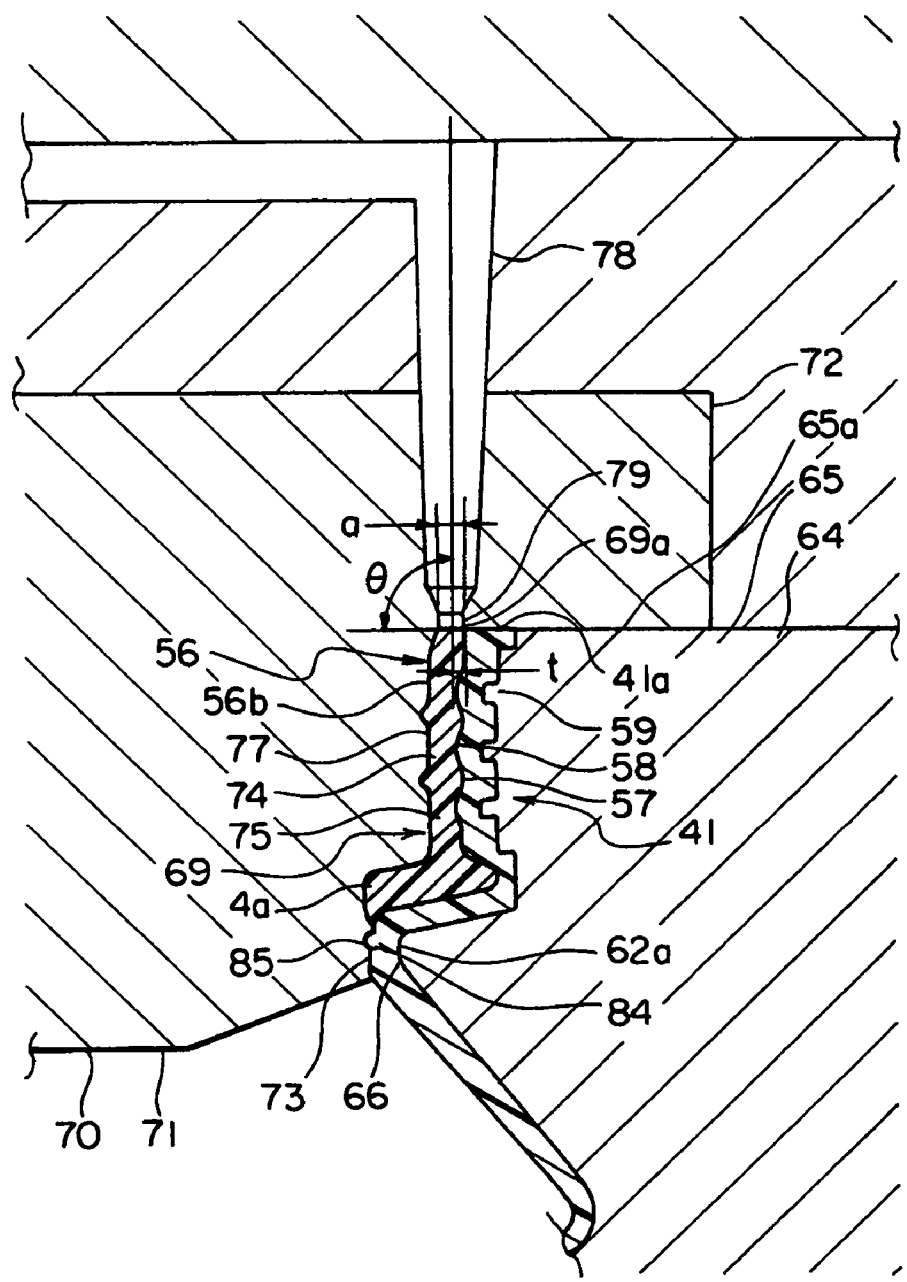
FIG. 4 is an enlarged cross-sectional view showing a main part in FIG. 3.
Figure 5:
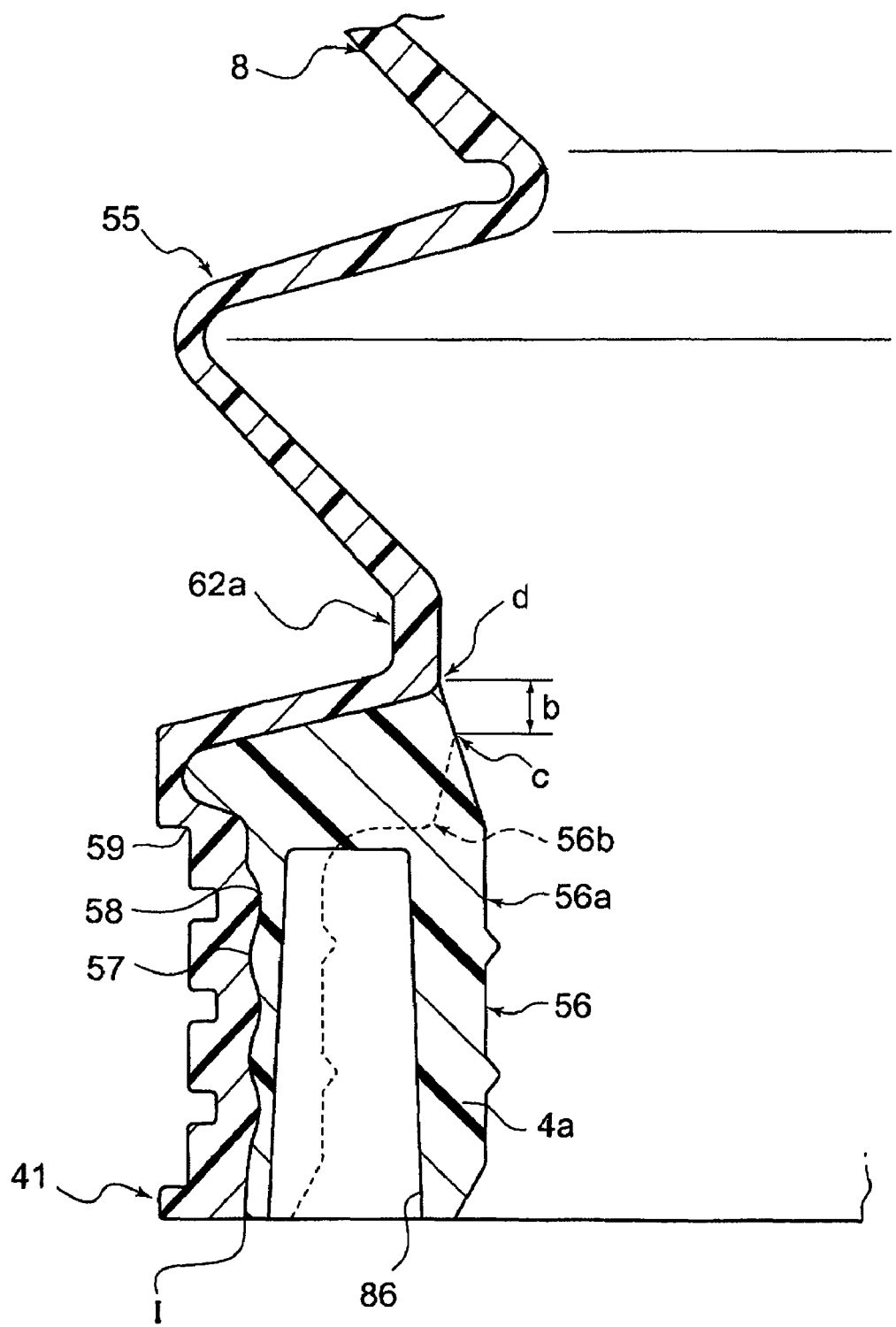
FIG. 5 is an enlarged cross-sectional view showing a secondarily molded large diameter side end portion in a partly omitted manner.

FIG. 1 is a vertical sectional view showing a resin boot for constant velocity universal joint in accordance with an embodiment of the present invention, FIG. 2 is a cross-sectional view showing the resin boot for constant velocity universal joint in accordance with the embodiment of the present invention, FIG. 3 is a simplified cross-sectional view showing the secondary molding step of this embodiment, FIG. 4 is an enlarged cross-sectional view showing a main part in FIG. 3, and FIG. 5 is an enlarged cross-sectional view showing a secondarily molded large diameter side end portion in a partly omitted manner.

Figure 24:
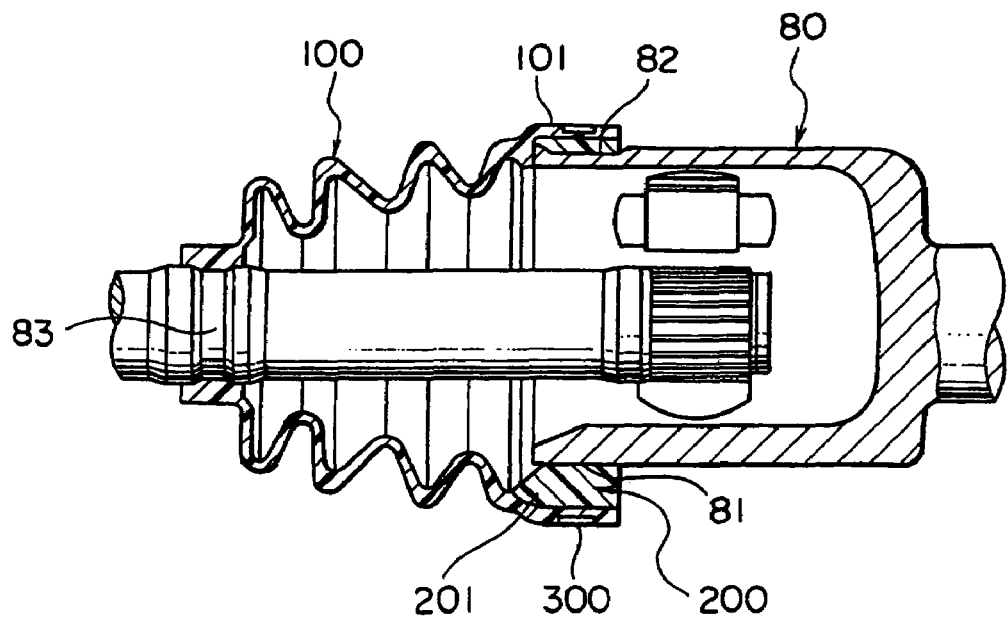
FIG. 24 is a vertical sectional side view of a form of a conventional resin boot for constant velocity universal joint being mounted on a tripod joint.
Figure 25:
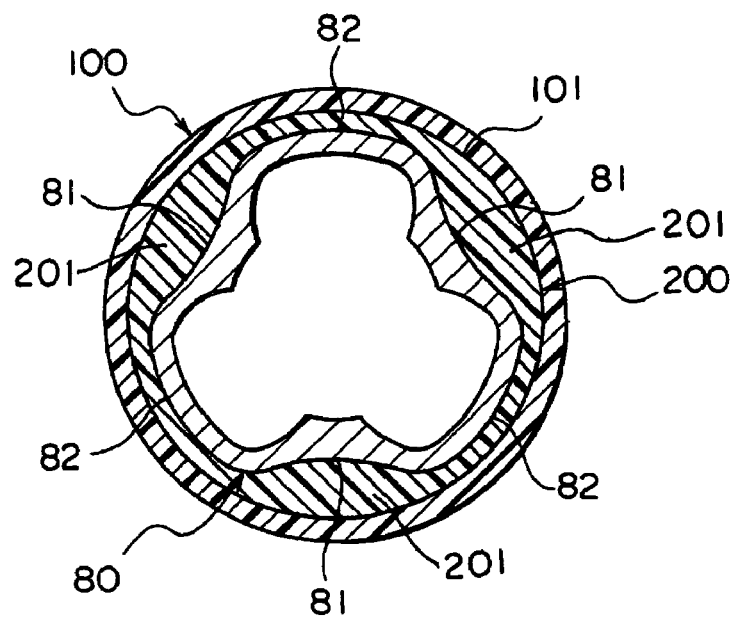
FIG. 25 is a vertical sectional front view of a form sectionalized at the position of the large diameter side end portions of the resin boot for constant velocity universal joint in accordance with the form in FIG. 24.

The resin boot for constant velocity universal joint in accordance with the embodiment of the present invention is used for a constant velocity universal joint in which a desired recess portion is formed on an outer surface, that is, a tripod joint (for example, the tripod joint 80 described in the prior art and shown in FIG. 24 and FIG. 25).

The boot in accordance with this embodiment as shown in FIG. 1 includes a resin bellows 8 (FIG. 6 and FIG. 7) corresponding to a primarily molded product having a bellows-shaped portion 55 formed in a conical shape, a large diameter side end portion 41 formed in one end side of the bellows-shaped portion 55, and a small diameter side end portion 40 formed in another end side, which are integrally molded by using a thermoplastic resin, and a different thickness portion 56 corresponding to a secondarily molded product which is integrally molded in an inner periphery of the large diameter side end portion 41 of the resin bellows 8 by using a thermoplastic resin.

Figure 6:
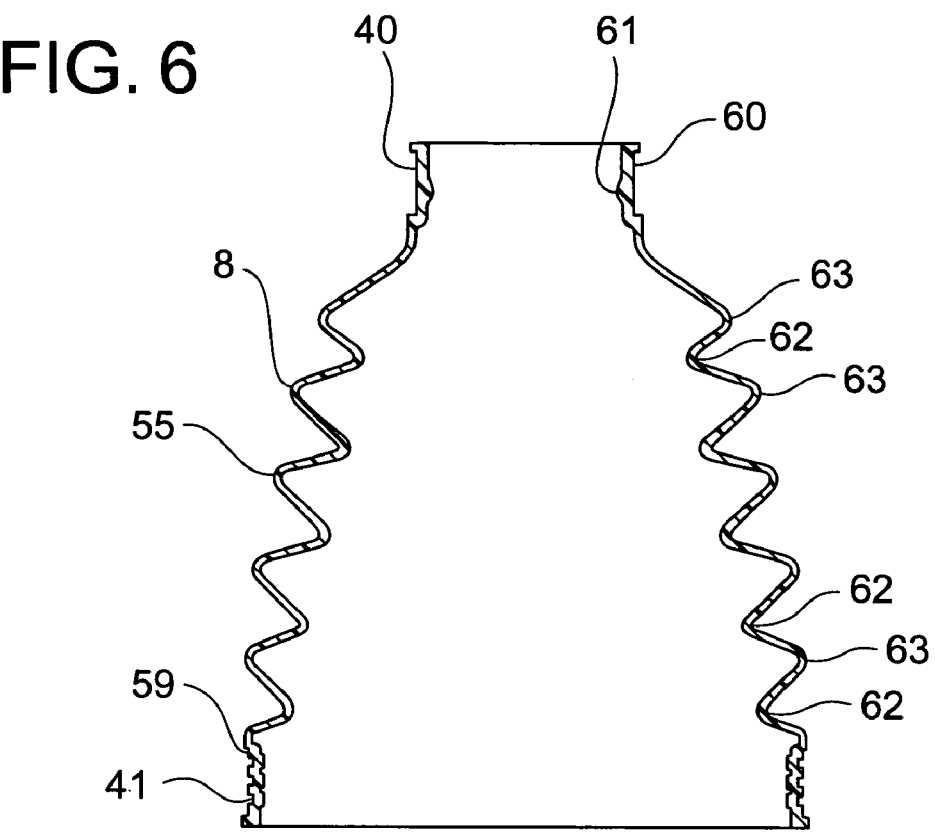
FIG. 6 is a simplified cross-sectional view of the resin bellows.
Figure 7:
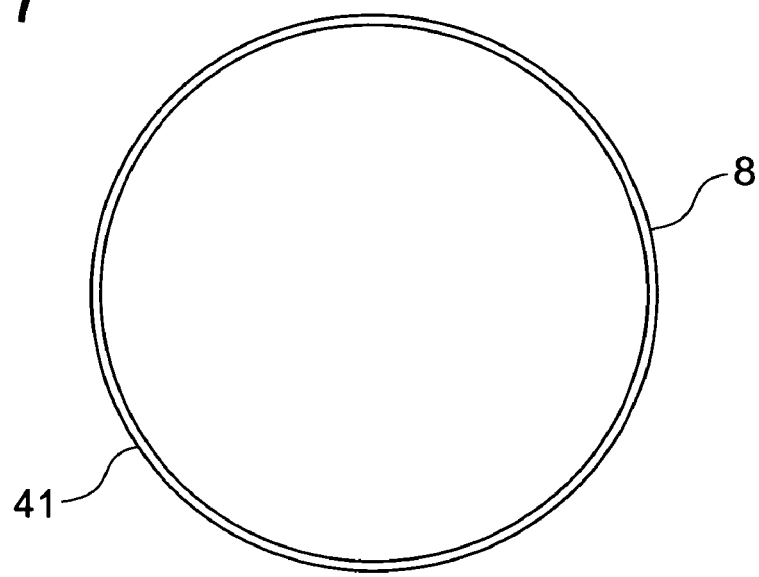
FIG. 7 is a bottom view of the resin bellows.
Figure 8:
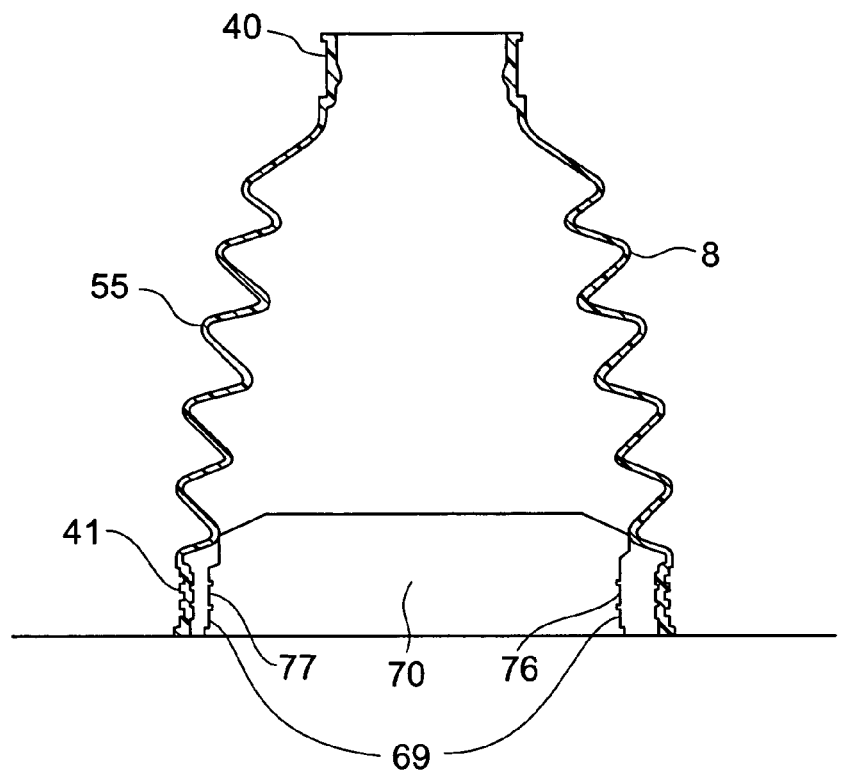
FIG. 8 is a simplified cross-sectional view showing a fitted form of an outer circumference of a core mold into an inner surface of a boundary between a large diameter side end portions of the resin bellows and the end portion of the bellows-shaped portion.
Figure 9:
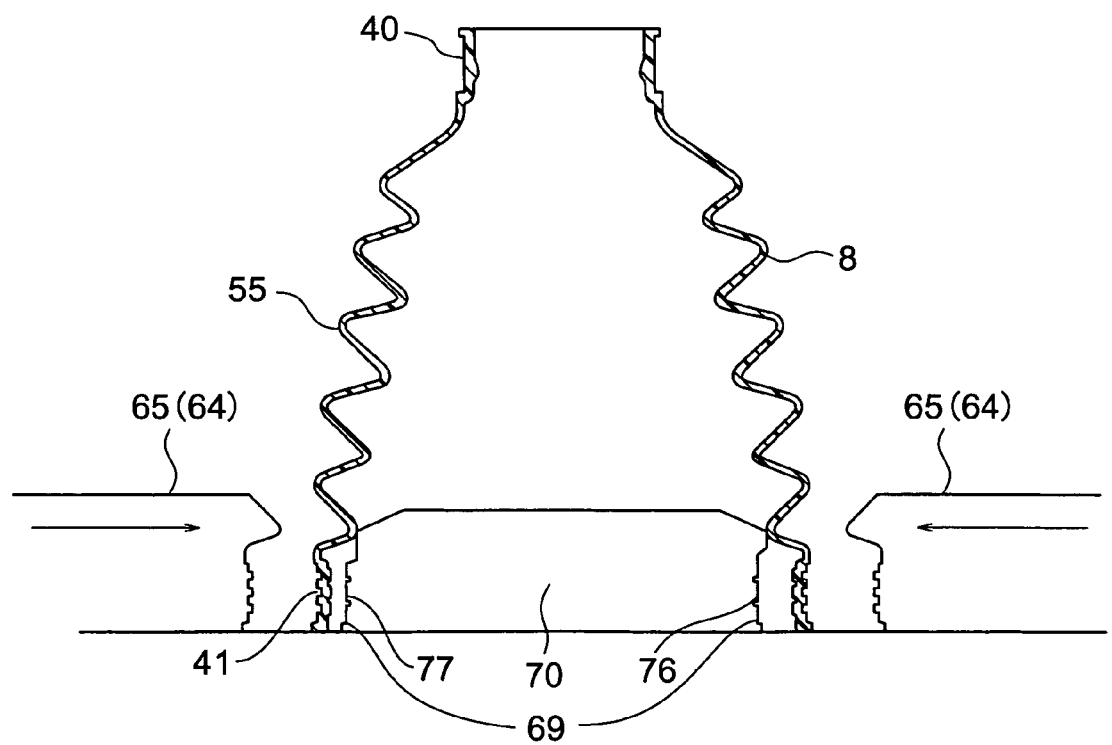
FIG. 9 is a simplified cross-sectional view showing a form of transferring to a step of clamping the outer surface of the large diameter side end portion of a resin bellows with a split mold.
Figure 10:
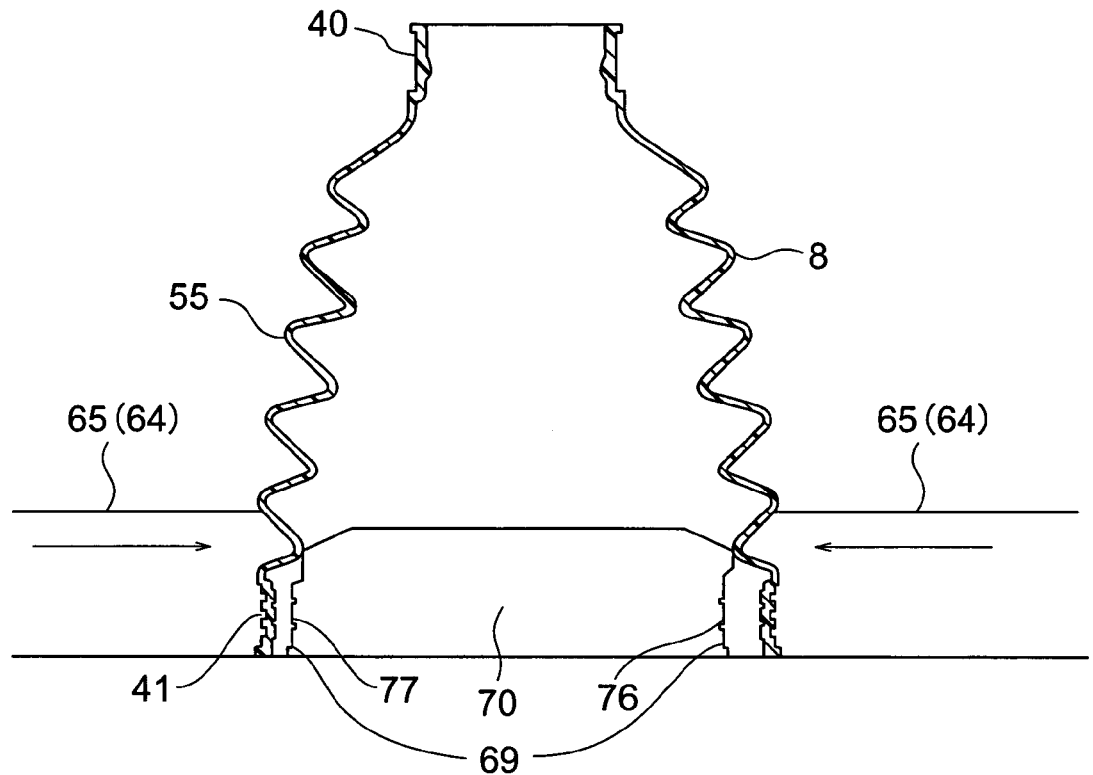
FIG. 10 is a simplified cross-sectional view showing a form of clamping the large diameter side end portion of a resin bellows with a core mold and a split mold.

First, a description will be given of the resin bellows 8 corresponding to the primarily molded product shown in FIG. 6 and FIG. 7. The resin bellows 8 corresponding to the primarily molded product is obtained by primarily molding the bellows-shaped portion 55, the large diameter side end portion 41 and the small diameter side end portion 40 in accordance with a known primary molding step. The large diameter side end portion 41 and the small diameter side end portion 40 are provided in both end sides of the resin bellows 8 so as to be communicated with an internal space of the bellows-shaped portion 55.

The bellows-shaped portion 55 has a desired thickness and is formed in an approximately conical shape structured such that a recess groove portion (also referred to as a valley portion) 62 in which an outer diameter (or an inner diameter) becomes smaller in accordance with being close to the small diameter side end portion 40 from the large diameter side end portion 41, and a convex groove portion (also referred to as a peak portion) 63 are alternately formed.

In this case, in the present invention, the bellows-shaped portion 55 is not particularly limited, and an optimum condition can be appropriately applied to terms and conditions such as a thickness of the bellows-shaped portion 55, a pitch between the valley portion 62 and the peak portion 63 and the like within the range of the present invention.

In accordance with the present embodiment, the large diameter side end potion 41 is structured such that an outer periphery is formed in an approximately complete round shape and is provided with a recess portion 59 for mounting a fastening device such as a desired shaped band or the like in a periphery, and an inner periphery, as shown in FIG. 5, is provided alternately with a recess-shaped portion 57 and a convex-shaped portion 58 which are continuously provided in a circumferential direction in a direction of height of an end portion, in order to improve a contact force with the different thickness portion 56 corresponding to the secondarily molded product, whereby the inner periphery is formed in a concavo-convex shape.

In accordance with the present embodiment, the small diameter side end potion 40 is structured such that an outer periphery is formed in an approximately complete round shape and is provided with a recess portion 60 for mounting a fastening device such as a desired shaped band or the like in a periphery, and an inner periphery is provided with a convex groove portion 61 fitted to a peripheral recess groove 83 which is formed in an outer periphery of a leading end of a drive shaft in a tripod joint 80 in a circumferential direction.

In this case, in the present embodiment, both of the large diameter side end portion 41 and the small diameter side end portion 40 mentioned above are respectively set to desired uniform thicknesses. These thicknesses are not particularly limited, and an optimum optional thickness is selected.

This several conditions of the large diameter side end portion 41 and the small diameter side end portion 40 are not specially limited and the most appropriate conditions are applied within a scope of the present invention. In the present embodiment, thickness of the large diameter side end portion 41 and the small diameter side end portion 40 are uniformed, however an embodiment in which the thickness is not uniformed falls within a scope of the present invention.

Next, a description will be given of the different thickness portion 56 corresponding to the secondarily molded product. The different thickness portion 56 corresponding to the secondarily molded product is welded and integrated (I) in the inner surface of the large diameter side end portion 41 in the resin bellows 8 corresponding to the primarily molded product in accordance with a secondary molding step.

Figure 17:
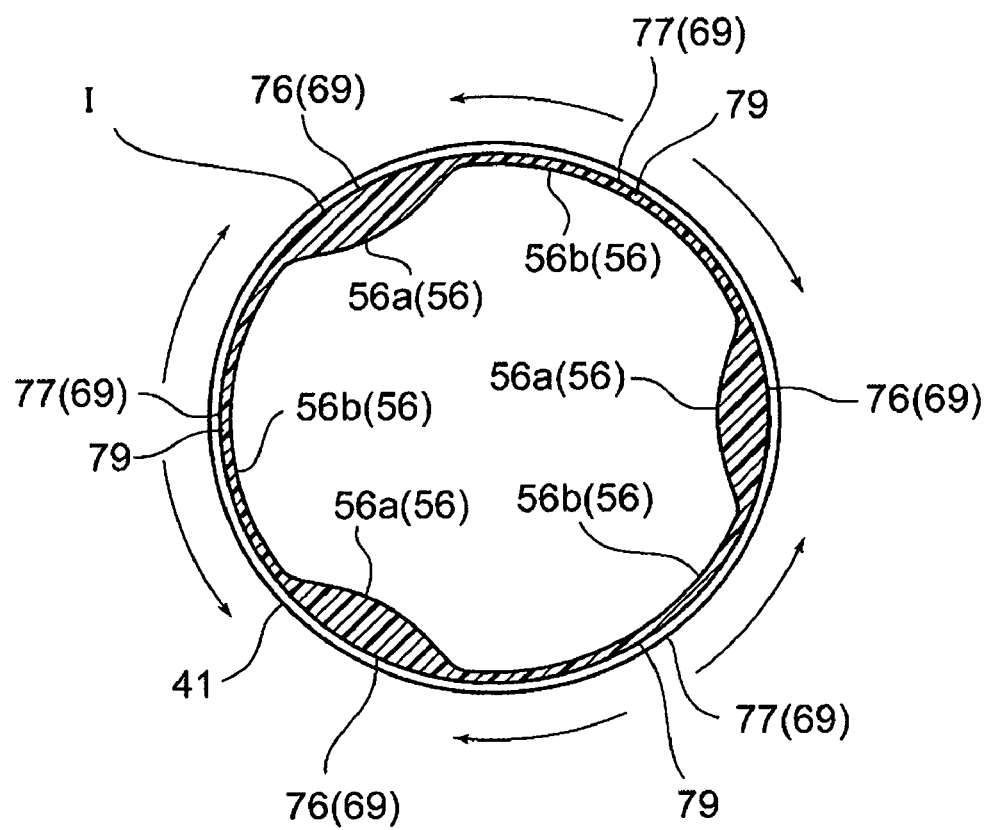
FIG. 17 is a simplified bottom view showing a form of the molten material being cured such that the entirely welded secondary molding part is integrated into the inner surface of the large diameter side end portions of the resin bellows.

In accordance with the present embodiment, the different thickness portion 56, as shown in FIG. 1, FIG. 2, and FIG. 17, is constituted by three large thickness portions 56a and three small thickness portions 56b which are alternately formed continuously in the inner periphery of the large diameter side end portion 41 of the resin bellows 8 with a fixed interval in a circumferential direction by using a thermoplastic resin (for example, a polyester thermoplastic elastomer).

In FIG. 5, a solid line portion shows the large thickness portion 56a, and a broken line portion shows the small thickness portion 56b. A range shown by reference symbol b in the drawing is a diametrically thickness common portion in each of the portions and has the same thickness in a circumferential direction. Further, a position shown by reference symbol c in the drawing shows a boundary point in the diametrical thickness between the large thickness portion 56a and the small thickness portion 56b.

The large thickness portion 56a is formed in a convex shape which is closely contacted with and fitted to the recess portion 81 formed in the outer periphery of the outer case of the tripod joint 80, and in the present embodiment, three large thickness portions are formed in an R-shaped convex shape at approximately regular intervals in the circumferential direction and protrude toward a central axis direction of the large diameter portion 41.

A depth of this large thickness portion 56a (the boundary point in the diametrical thickness between the large thickness portion 56a and the small thickness portion 56b) is up to an inner wall just before position d (close to the large diameter side end portion rather than an inner wall of a boundary 62a) of the boundary 62a between the large diameter side end portion 41 of the resin bellows 8 and the bellows-shaped portion 55.

The small thickness portion 56b is formed by a curved surface having an inner diameter which is closely contacted with the outer periphery of the outer case 82 except the recess portion 81 of the tripod joint 80. In this embodiment, the small thickness portion 56b has the diametrical thickness smaller than that of the large thickness portion 56a, and is disposed between the large thickness portions 56a.

That is, when the boundary point c between the end edge (depth) close to the direction of the small diameter side end portion 40 of the large thickness portion 56a and the inner surface of the small thickness portion 56b comes to the inner wall of the boundary 62a between the large diameter side end portion 41 and the bellows-shaped portion 55, there is a high risk that a crack is generated due to a stress generated in the periphery of the inner surface of the boundary 62a, on the basis of the expansion, the free movement and the like in the portion of the boundary 62a. Accordingly, the boundary point c is set such as not to be positioned in the inner wall of the boundary 62a mentioned above or the inner wall close to the small diameter side end portion over the inner wall of the boundary 62a.

Terms and conditions such as a shape, a number, a thickness, a width, a depth and the like of the large thickness portion 56a and the small thickness portion 56b can be appropriately changed in correspondence to an outer peripheral shape of the tripod joint to be subjected.

Further, in the present embodiment, as shown in FIGS. 2 and 5, two non-penetrating holes (recess portions) 86 are provided in an axial direction of the large thickness portion 56a, thereby intending to achieve a weight saving, a shrinkage prevention and an improvement of elasticity.

In this case, one or two holes 86 are provided in all of the large thickness portions. Further, in the present embodiment, the hole 86 is provided in all of the large thickness portions, however, may be provided in optionally selected large thickness portions. Further, in the present embodiment, the hole is formed in the frustum shape which has a complete round shape in a cross-sectional view and has the diameter smaller in accordance with going in the depth direction (the direction of the small diameter side end portion), however, it is possible to select any optional shape such as an oval shape in a cross-sectional view, a tear drop shape in a cross-sectional view or the like, and it is possible to change in design within the range of the present invention.

The thermoplastic resin for structuring the resin bellows 8 corresponding to the primarily molded product and the different thickness portion 56 corresponding to the secondarily molded product is not particularly limited, an optimum material within the range of the present invention is selected, and whichever they are made of the same material, materials having different hardness or different materials, they are within the range of the present invention. In this case, the different thickness portion 56 corresponding to the secondarily molded product is preferably made of a material having a seal function of preventing the grease from leaking, and on the other hand, the resin bellows 8 corresponding to the primarily molded product can select a material which purely corresponds to an inherent object, that is, a material having a bending property, a heat resistance, a cold resistance and the like.

Next, a description will be given of one embodiment of a method of manufacturing the resin boots for constant velocity universal joint in accordance with the present invention.

[Resin Bellows Preparing Step]

As a method of molding the resin bellows 8 (FIG. 6 and FIG. 7) in which the thickness of the large diameter side end portion 41 mentioned above is uniform, a blow molding, an injection blow molding and the like are well known, however, the method is not particularly limited, and an optimum bellows molding method is appropriately employed within the range of the present invention.

[Secondarily Molding Step]

The present step is a secondarily molding step of integrally molding the different thickness portion 56 corresponding to the secondarily molded product in the inner surface of the large diameter side end portion 41 of the bellows 8 by holding resin bellows 8, which is the primarily molded in accordance with the resin bellows preparing step, within the injection molding metal mold 64, and injecting a desired molten material, for example, a thermoplastic resin 4a having a high temperature equal to or more than 260° C. within the metal mold 64 at a high speed. A description will be given of one embodiment thereof with reference to FIGS. 3 to 18. In this case, since the known structures are applied to the other structures than the structure described below, a description thereof will be omitted. In this case, the injected thermoplastic resin has the temperature equal to or more than 260° C., however, the resin is not particularly limited, and can be appropriately changed in design within the range in which the raw material is not changed.

First, by inserting a core mold 70 to the inner surface of the large diameter side end portion 41 of the primarily molded resin bellows 8 mentioned above, a desired secondarily molding space 69 is formed continuously in a circumferential direction between the inner surface of the large diameter side end portion 41 of the resin bellows 8, and thereafter by insert holding into the resin bellows placing space 68 of the split mold 65 the resin bellows 8 and the core mold 70 are clamped.

The injection molding metal mold 64 is formed of a resin bellow placing space 68 coinciding with an outer appearance shape (an outer profile) of the resin bellows 8 by a desired split mold 65 constituting the metal mold 64.

In this case, it is possible to employ a step of previously holding the resin bellows 8 as well as inserting to the resin bellows placing space 68, forming a desired secondarily molding space 69 with respect to the inner periphery of the large diameter side end portion 41 of the resin bellows 8 so as to insert and arrange the core mold 70, and thereafter clamping the mold. This step is within the range of the present invention.

The resin bellows placing space 68 forms a profile in which the outer appearance shape of the resin bellows 8 is closely contacted with an inner surface at a time of clamping the mold, and is formed in such a manner that an opening edge 41*a* of the large diameter side end portion 41 of the resin bellows 8 is flush with an upper end surface 65*a* of the split mold 65.

The core mold 70 is constituted by an approximately cylindrical core portion 71 inserted into an inner periphery of the large diameter side end portion 41 of the resin bellows 8, and a disc-like collar portion 72 extended in a horizontal direction from an upper end of the core portion 71, and forms an outer peripheral shape of the tripod joint 80 to be subjected, the same outer peripheral shape as the outer diameter and a portion corresponding to the outer diameter in an outer peripheral portion 74 between an outer periphery 73 closest to a leading end side of the core portion 71 and the collar portion 72. Further, when the collar portion 72 is brought into contact with the upper end surface 65*a* of the split mold 65 so as to seal the above side of the secondary molding space 69, and the outer peripheral portion 74 of the core portion 71 is inserted, the bellows valley portion 62*a* closest to the large diameter side end portion 41 in the resin bellows 8 is clamped by the outer periphery 73 closest to the leading end side of the outer peripheral portion 74 and the peak portions 66 of the opposing split molds 65.

The secondary molding space 69 formed by inserting the outer peripheral portion 74 of the core portion 71 to the inner periphery of the large diameter side end portion 41 of the resin bellows 8 is formed as a desired space by the outer peripheral shape of the core portion 71 and the inner peripheral shape of the large diameter side end portion 41.

In the present embodiment, three recess portions 75 are formed with predetermined interval in the outer peripheral portion of the core portion 71 and thus the large thickness portion molding space 76 is formed between these recess portions 75 and the inner periphery of the large diameter side end portion 41 of the bellows 8, the small thickness portion molding space 77 connected with the large thickness portion molding space 76 is formed between the outer periphery other than the recess portion 75 and the inner periphery of the large diameter side end portion 41 of the bellows 8.

That is, when the boundary point c between the end edge (depth) close to the direction of the small diameter side end portion 40 of the large thickness portion 56*a* and the inner surface of the small thickness portion 56*b* comes to the inner wall of the boundary 62*a* between the large diameter side end portion 41 and the bellows-shaped portion 55, there is a high risk that a crack is generated due to a stress generated in the periphery of the inner surface of the boundary 62*a*, on the basis of the expansion, the free movement and the like in the portion of the boundary 62*a*. Accordingly, the boundary point c is set such as not to be positioned in the inner wall of the boundary 62*a* mentioned above or the inner wall close to the small diameter side end portion over the inner wall of the boundary 62*a*.

Further, the sprue is provided with projections (not shown) for forming one or two holes 86 arranged in the large thickness portion 56*a* at desired positions (three positions in the present embodiment) of the collar portion 72 with a fixed interval. Accordingly, the hole 86 can be formed at the same time of the secondary molding (FIG. 2 and FIG. 5).

Figure 12:
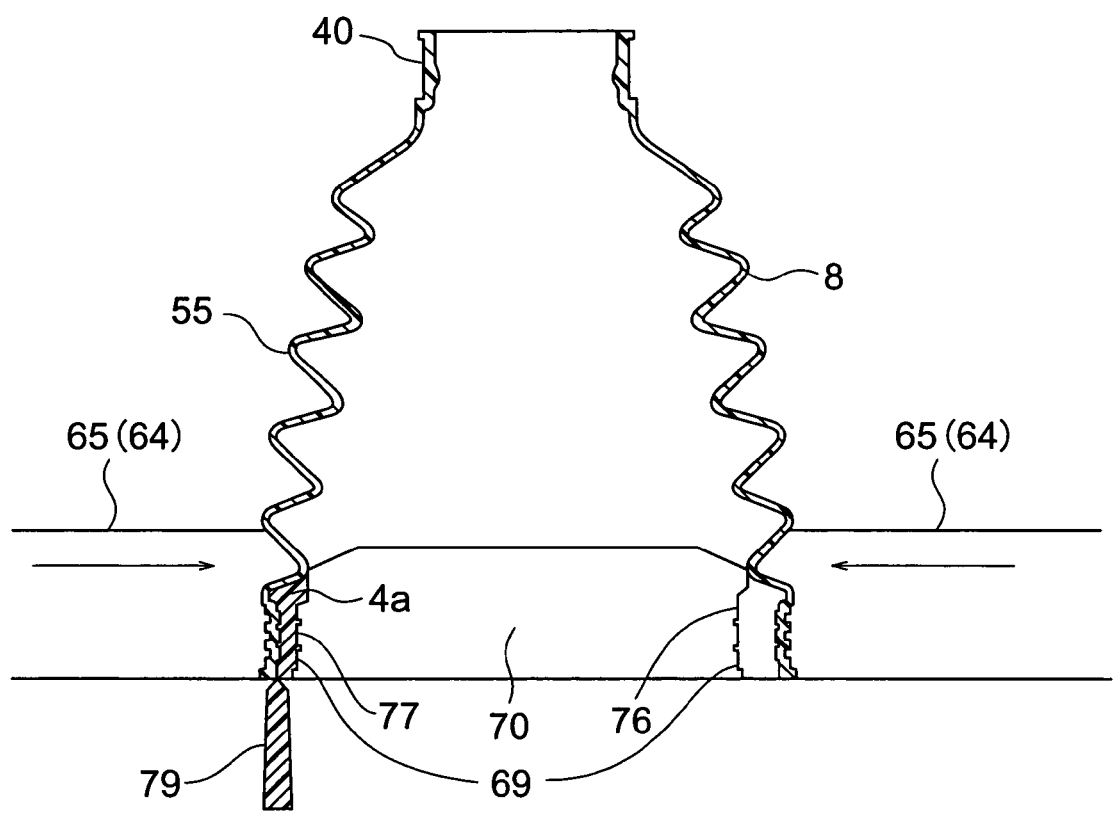
FIG. 12 is a simplified cross-sectional view showing a form of injecting the molten materials from small thickness portion molding spaces.

A pin gate 79 for injecting the thermoplastic resin into the secondary molding space 69 via a sprue 78 is formed in the collar portion 72 (FIGS. 3, 4 and 12). Position of the pin gate 79 of one or a plurality of an arbitrary place in the secondary molding space 69 is selected. For example, it is possible to position the pin gate 79 in the small thickness portion molding space 77.

In the present embodiment, the pin gate 79 is selectively provided in an approximately center in the circumferential direction of the small thickness portion molding space 77.

Further, the thermoplastic resin 4*a* is injected to each small thickness portion molding space 77, 77, 77 from an approximately center in the circumferential direction of the each small thickness portion molding space 77, 77, 77 in the secondary molding space 69, and from the pin gate 79, 79, 79 mounted on every small thickness portion molding space 77, 77, 77 (FIGS. 3, 4 and 12).

As mentioned above, as for the thermoplastic resin 4*a* injected from the pin gate 79 constituted on the approximately center in the circumferential direction of each small thickness portion molding space 77, the small thickness portion molding space (small space in the interval in the diametrical direction) 77 to the large thickness portion molding space (large space in the interval in the diametrical direction) 76 doubles as a part of a runner, and the thermoplastic resin 4*a* is fed to the large thickness portion molding space 76 in a split second with a high speed and a high temperature while maintaining a high temperature state, so that a weld or an air involving is not absolutely generated, and the inner periphery of the bellows large diameter side end portion 41, and the large thickness portion 56*a* and the small thickness portion 56*b* formed by the secondary molding are completely welded and integrated.

Figure 11:
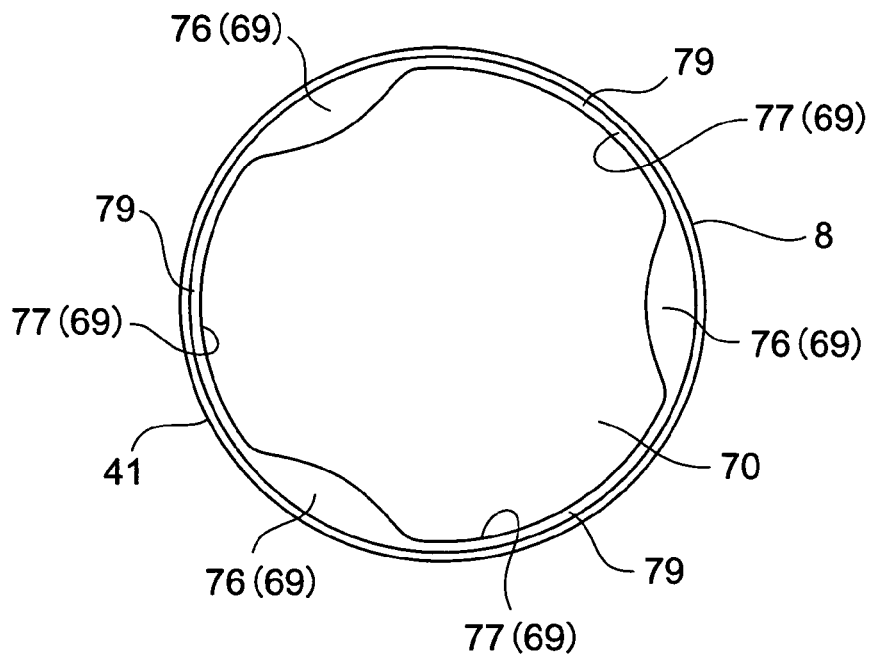
FIG. 11 is a simplified view showing the injection positions of a molten material (pin gate positions)

Particularly, in the present embodiment, for example, it is assumed of the case where there are three large thickness portion molding spaces 76 and three small thickness portion molding space 77 therebetween, and the thermoplastic resin 4*a* is injected from each pin gate 79 constituted on the approximately center in the circumferential direction of each of the mentioned small thickness portion molding space 77 (FIG. 11 and FIG. 12).

Figure 13:
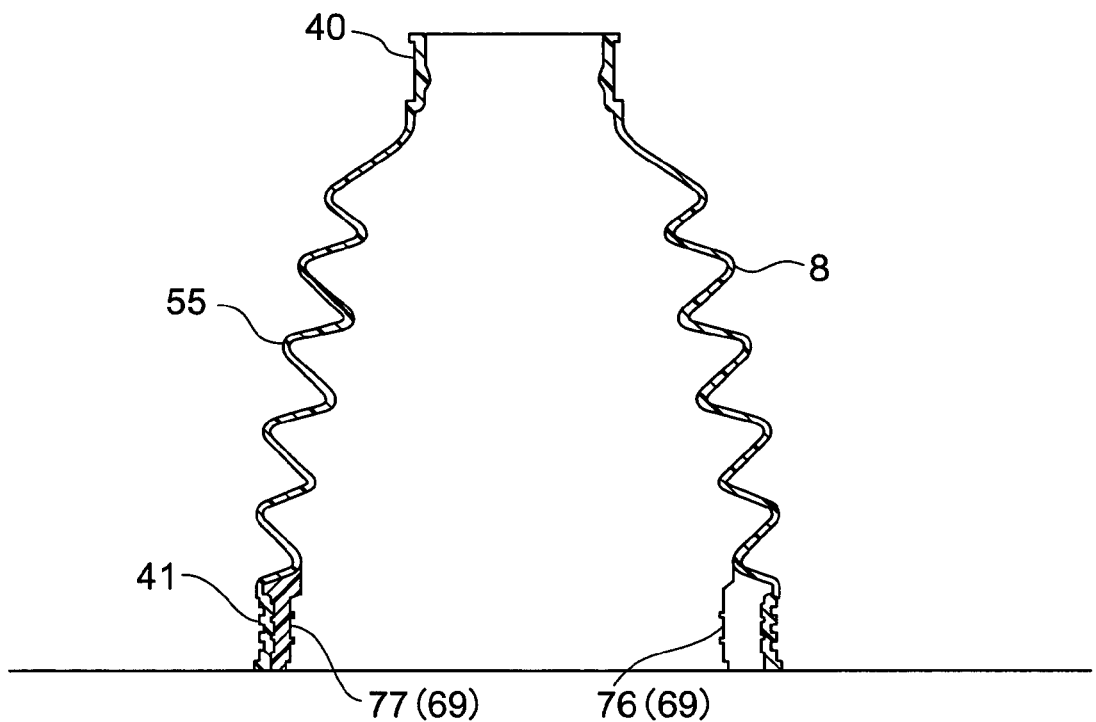
FIG. 13 is a simplified cross-sectional view showing a form of the molten material, which is injected from the small thickness portion molding spaces, flowing in the small thickness portion molding spaces.
Figure 14:
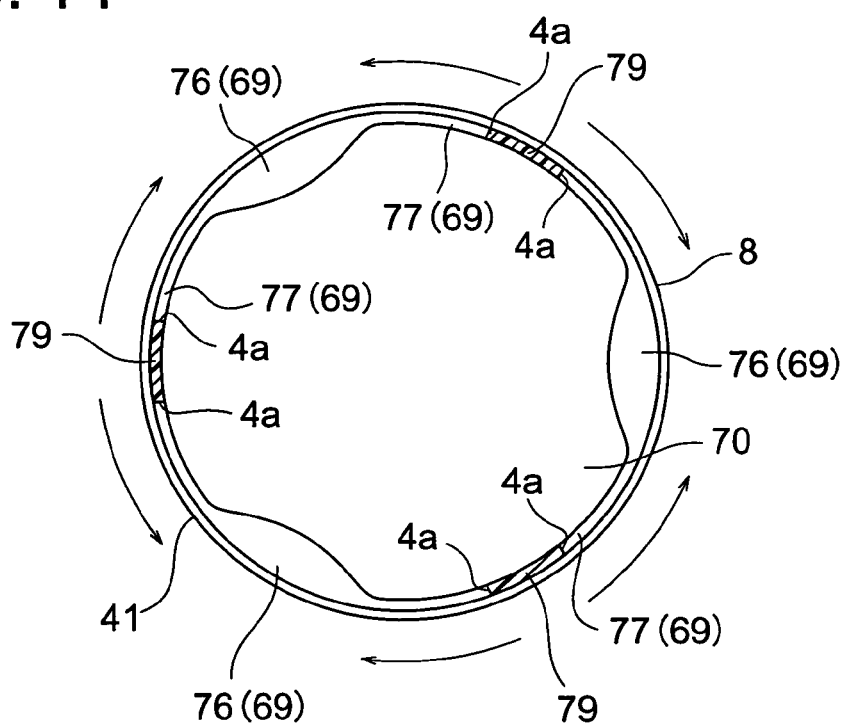
FIG. 14 is a simplified bottom view showing a form shown from the bottom side of the large diameter side end portion of the form in FIG. 13.
Figure 15:
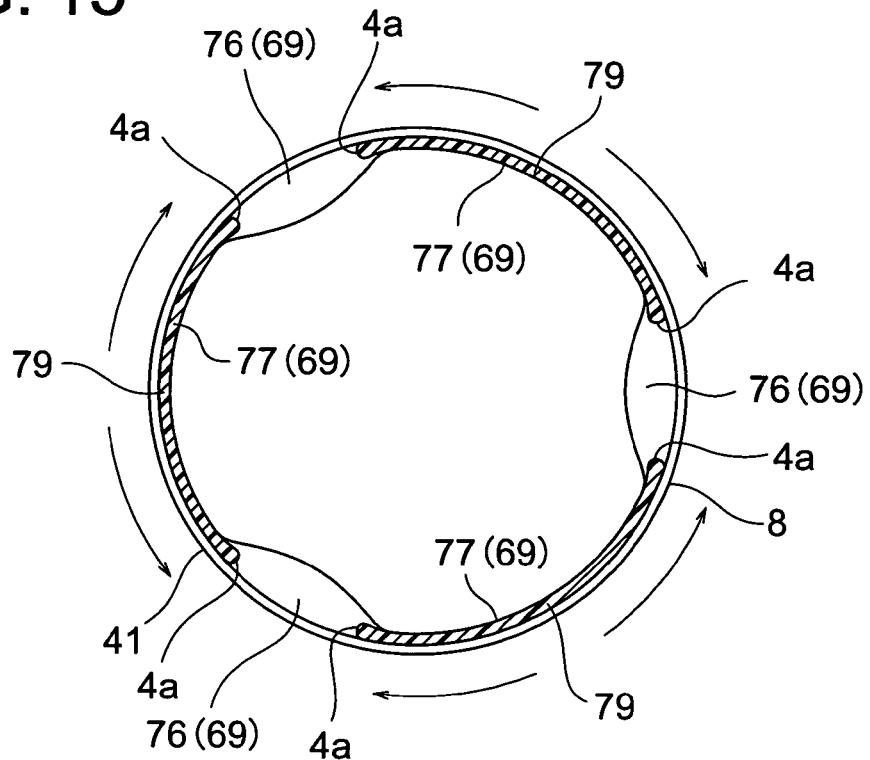
FIG. 15 is a simplified bottom view showing a form of the molten material, which is injected from the small thickness portion molding spaces, flowing to the opposite two sides of conical directions each directing the large thickness molding spaces.

The thermoplastic resin 4*a* injected from the pin gate 79 constituted on the approximately center in the circumferential direction of each small thickness portion molding space 77, is immediately flown in six flows of which divided into two opposite conical directions individually, whereby the thermoplastic resin 4*a* becomes a laminar flow which runs to the direction of each large thickness portion molding space 76 at high speed while maintaining high temperature (FIGS. 13, 14 and 15). Arrows in each Figure represents the flow of each thermoplastic resin 4*a*.

That is, the thermoplastic resin 4*a* injected from the pin gate 79 constituted on the approximately center in the circumferential direction of each small thickness portion molding space 77, runs in six flows so as to be brought into slidable contact with the inner surface of the large diameter side end portion 41 of the resin bellows 8, whereby the temperature of the inner surface of the large diameter side end portion 41 is elevated near to that of the thermoplastic resin 4*a* for secondary molding, and is melted.

Figure 16:
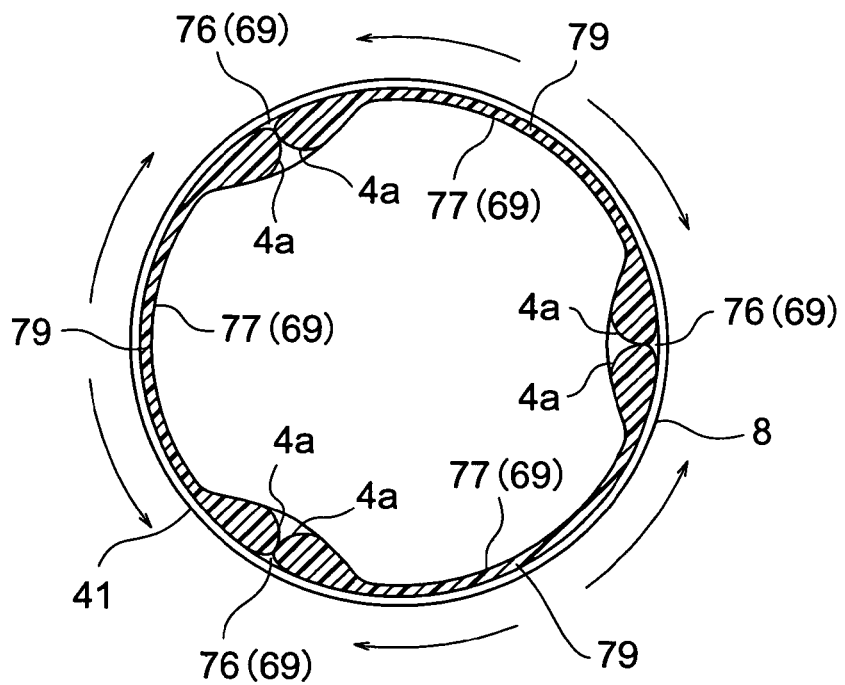
FIG. 16 is a simplified bottom view showing a form of the molten materials flown into the large thickness molding spaces being mixed and flown together.

Next, the two opposite flows of the like of the six flows are immediately released into the large thickness portion molding space 76 as to collide as being a turbulent flow, and two of the flows are mixed in complex to a sing flow (FIG. 16).

Such interflow of the thermoplastic resins 4*a* is generated at three large thickness portion molding spaces 76 simultaneously.

As described above, the thermoplastic resin 4*a* is charged in every corner of the secondary molding space (large thickness portion molding space 76 and small thickness portion molding space 77) 69.

As a result, there is hardly any contact portion (weld) or shrink mark, and the inner surface of the large diameter side end portion (primary molding portion) 41 of the resin bellows 8 and the secondary molding portion (each large thickness portion 56a and small thickness portion 56b) are completely welded and integrated (I; FIG. 17).

Figure 18:
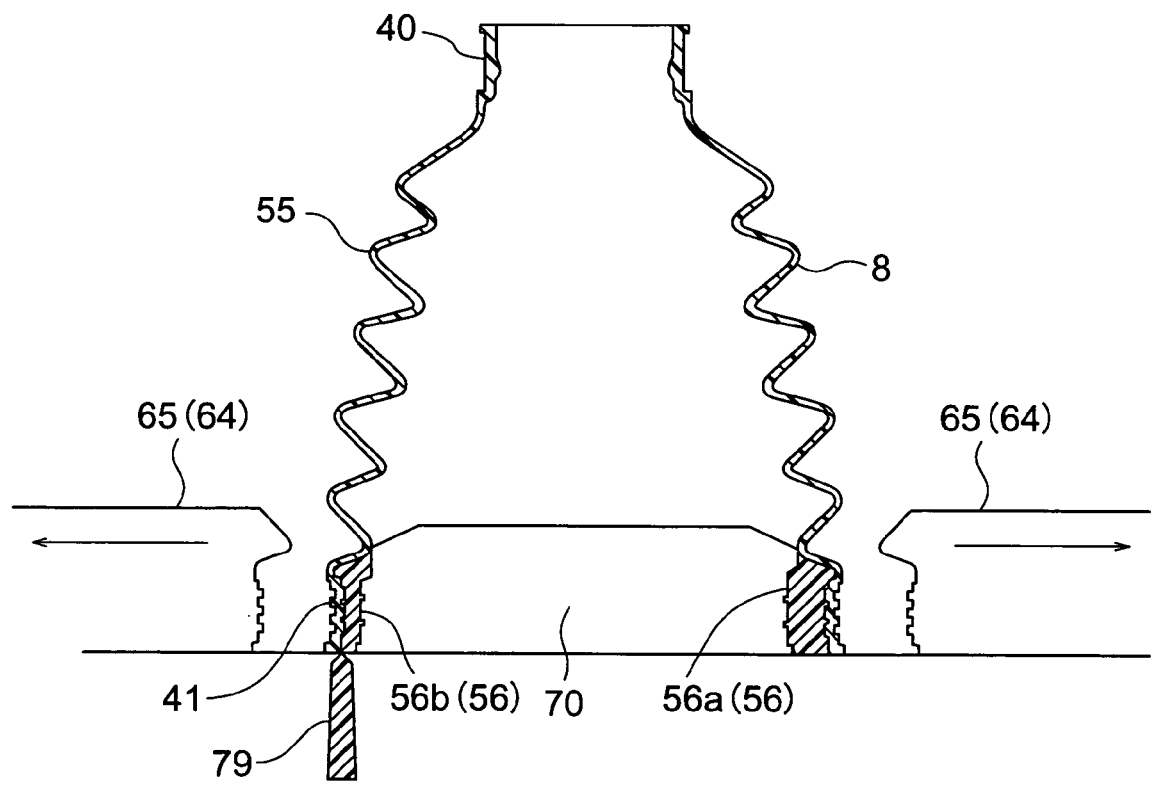
FIG. 18 is a simplified cross-sectional view showing an open form of the split mold.

FIG. 18 shows a state after completion of the secondary molding, in which the split mold 65 is pulled back as to remove from the clamping state, and the molded boots is released from the mold.

In this case, the structure may be made such that the pin gate 79 is provided in the large thickness portion molding space 76, and the thermoplastic resin 4a is injected from only the large thickness portion molding space 76 or from a plurality of portions including the large thickness portion molding space 76, however, in view of preventing the air defect, the weld defect and the like, it is preferable that the pin gate 79 is provided in the small thickness portion molding space 77 as in the present embodiment.

Further, in accordance with the present embodiment, in order for the inner surface of the boundary 62a between the large diameter side end portion 41 of the resin bellows 8 and the bellows-shaped portion 55, and the outer periphery 73 closest to the leading end side of the core portion 71 which is in contact with the inner surface of the boundary 62a to form so as to be fitted to each other, a self-seal effect caused by the injection pressure is generated as well as the contact force of that portion is increased, so that it is possible to increase the injection pressure of the thermoplastic resin 4a at a time of the secondary molding. Accordingly, it is possible to firmly weld the inner periphery of the large diameter side end portion 41 of the resin bellows 8 to the different thickness portion 56 formed by the secondary molding.

For example, in the present embodiment, a convex groove portion 84 continuously provided in a circumferential direction is integrally molded on the inner surface of the boundary 62a between the large diameter side end portion 41 of the resin bellows 8 and the bellows-shaped portion 55, and a recess groove portion 85 opposing to the convex groove portion 84 on the inner surface of the boundary 62a is continuously formed in the circumferential direction in the outer periphery 73 closest to the leading end side of the core portion 71, thereby increasing the contact force on the basis of the fitting between the convex groove portion 84 and the recess groove portion 85. In this case, in reverse to the present embodiment, the structure may be made such that the recess groove portion continuously provided in the circumferential direction is integrally formed on the inner surface of the boundary 62a between the large diameter side end portion 41 of the resin bellows 8 and the bellows-shaped portion 55 at a time of the primary molding, and on the other hand, the convex groove portion opposing to the recess groove portion on the inner surface of the boundary 62a is formed continuously in the circumferential direction in the outer periphery 73 closest to the leading end side of the core portion 71. Accordingly, it is possible to appropriately change design within the range of the present invention as far as the structure can increase the contact force between both of the elements.

Further, when forming at least any one of the convex portion and the recess portion on the inner surface of the large diameter side end portion 41 of the resin bellows 8 at the same time of the primary molding mentioned above, it is possible to firmly weld to the different thickness portion 56 corresponding to the secondarily molded product.

For example, in accordance with the present embodiment, since a plurality of recess portions 57 and convex portions 58 which are continuously provided in the circumferential direction are alternately arranged in the height direction of the inner surface of the large diameter side end portion 41, it is possible to increase a welding area (I) between the inner surface of the large diameter side end portion 41 of the resin bellows 8 corresponding to the primarily molded product and the different thickness portion 56 corresponding to the secondarily molded product, and it is possible to firmly weld the both. In this case, in accordance with the present embodiment, the structure is made such that a plurality of recess portions 57 and convex portions 58 are provided, however, the structure is not limited to this as far as the structure can achieve a firm welding as mentioned above. For example, it is possible to consider that one or a plurality of independent projections or recesses is provided, and in this case, a length of the projection can be optionally set.

Further, in the case that the convex portion 58 extending in the circumferential direction is formed on the inner surface of the large diameter side end portion 41 of the resin bellows 8, the convex portion 58 doubles as a dam, and serves an operation of uniformly flowing the thermoplastic resin 4a injected from the pin gate 79 to the small thickness portion molding space 77 from the small thickness portion molding space 77 to the large thickness portion molding space 76. That is, in the case of forming the convex portion 58 as the dam, the high speed and high temperature thermoplastic resin 4a injected to the small thickness portion molding space 77 first flows in the direction of the large thickness portion molding space 76 along a drift space (a drift space above the convex portion 58) between the pin gate 79 and the convex portion 58, subsequently flows into a drift space below the convex portion 58, and flows so as to follow along the drift space. Further, the thermoplastic resins 4a flowing along the respective drift spaces reach the large thickness portion molding space 76 at the same time. It is preferable to adjust the height and the length of the convex portion 58 so that the thermoplastic resins 4a flowing to a plurality of drift spaces can reach the large thickness portion molding space 76 at the same time.

In this case, it is sufficient that the convex portion 58 is formed at least on the inner surface of the large diameter side end portion 41 corresponding to the small thickness portion molding space. Further, the convex portion 58 is optionally provided in the present invention, and the number of the convex portions 58 can be appropriately changed in design.

It is possible to further firmly weld the resin bellows 8 corresponding to the primarily molded product to the different thickness portion 56 corresponding to the secondarily molded product by setting the injection condition of the thermoplastic resin 4a into the secondary molding space 69 as follows.

That is, a direction θ of the injection pin gate 79 is set under a condition $0° \leq θ \leq 90°$, with respect to the inner surface of the large diameter side end portion 41 of the resin bellows 8, a position condition of the injection pin gate 79 is set to a condition $0 \leq t \leq 2a/3$ in which a distance between the inner surface of the large diameter side end portion 41 of the resin bellows 8 and the injection pin gate 79 is set to t, and a diametrical distance of the injection side end portion 69a of the secondary molding space 69 is set to a.

Accordingly, the high temperature thermoplastic resin 4a is injected so as to be brought into slidable contact with the inner surface of the large diameter side end portion 41 of the resin bellows 8, and the thermoplastic resin 4a is charged into the secondary molding space 69.

At this time, since the injected high temperature thermoplastic resin 4a flows so as to be brought into slidable contact with the inner periphery of the large diameter side end portion 41 at a high speed, impurities attached on the surface of the inner periphery of the large diameter side end portion 41 are washed out, and a heat of the thermoplastic resin 4a flowing at the high temperature and high speed is transmitted to the surface of the inner periphery, thereby melting the inner surface. Therefore, the injected thermoplastic resin 4a is firmly welded to the surface of the large diameter side end portion 41 which is melted by the heat of the thermoplastic resin 4a, and the different thickness portion 56 is integrally molded in the inner periphery of the large diameter side end portion 41 in accordance with the secondary molding.

Further, in accordance with the present embodiment, when holes 86 are structured in the large thickness portion by the above described step, a volume of the large thickness portion 56a is reduced, so that it is possible to make cooling times for the small thickness portion 56b and the large thickness portion 56a coincident or approximate with each other. Further, since a turbulent flow is extremely less generated at a time when the thermoplastic resin 4a flows in the large thickness portion molding space 76, a weld or an air involving is not absolutely generated.

That is, the following operation and effect are generated, and a sealing property is consequently improved. Since the volume of the large thickness portion 56a is reduced, it is possible to intend a weight saving. It is possible to provide a product which has no shrink mark and has an extremely high dimensional accuracy. Further, a band fastening force has no difference between the small thickness portion 56b and the large thickness portion 56a, and becomes approximately uniform in all peripheries. Since the large thickness portion 56a has an elastic force, the large thickness portion fits to the outer periphery of the tripod joint.

Second Embodiment

In the first embodiment as described above, a different thickness portion 56 composed of large thickness portions 56a and small thickness portions 56b are welded and integrated (I) in the inner surface of a large diameter side end portion 41 of a primarily molded resin bellows 8 in accordance with a secondary molding. However, the second embodiment shown in FIGS. 19 to 22 adopted the embodiment in which a different thickness portion 560 composed of large thickness portions 560a and small thickness portions 560b are integrally injection molded in the outer surface of a large diameter side end portion 410 of a primarily molded resin bellows 800 in accordance with a secondary molding, in the purpose to achieve the same object, which will be described in detain below.

Figure 23:
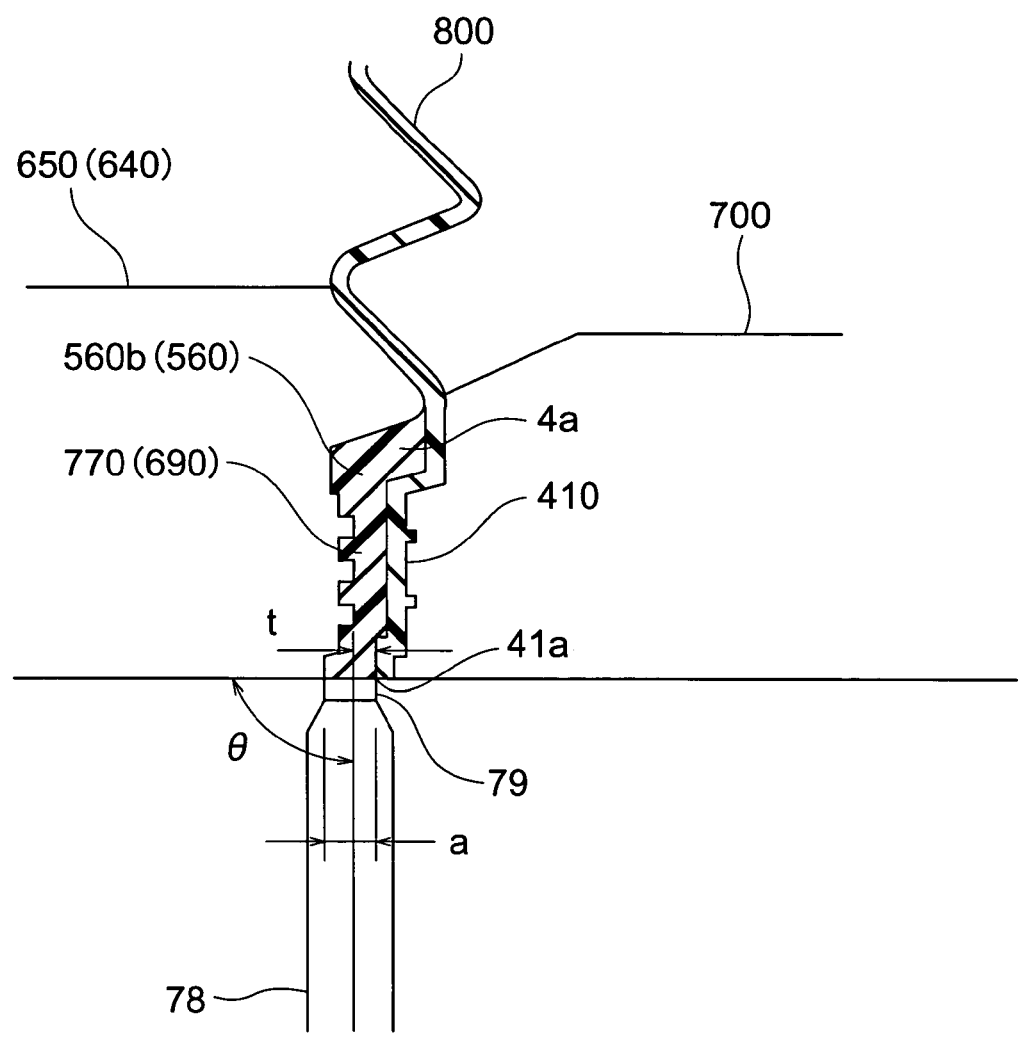
FIG. 23 is an enlarged simplified cross-sectional view showing the position of the pin gate in FIG. 19.

First, a resin bellows 800 which is primarily molded product, during the primary molding, forms a large diameter side end portion 410 into an approximately similar shape to that of an outer peripheral surface of an outer case of the constant velocity universal joint. Particularly, the resin bellows 800, during the primary molding, forms the large diameter side end portion 410 on the inner surface form and outer surface form (an approximately similar shape to that of an outer peripheral surface of an outer case having convex-recess portion in circumferential direction) constituted of three openings of a recess portion 410b corresponding to the outer peripheral surface of an outer case of the constant velocity universal joint (tripod joint) 80 previously shown in FIGS. 23 and 24, and the surface portion 410c of the large diameter side end portion 410 without the recess portion 410b (refer to FIG. 19 and FIG. 20). In the present embodiment, the thickness of the large diameter side end portion 410 is the same throughout the circumferential direction as presented, but the embodiment is not limited thereto.

In addition, the resin bellows 800 of the present embodiment constitutes the components of the first embodiment, except that the large diameter side end portion 410 is formed into an approximately similar shape to that of an outer peripheral surface of an outer case of the constant velocity universal joint.

The different thickness portion 560 corresponding to the secondarily molded product is welded and integrated (I) to the outer surface of the large diameter side end portion 410 of resin bellows 800 corresponding to the primarily molded product by the secondary molding step which will be described below.

Figure 22:
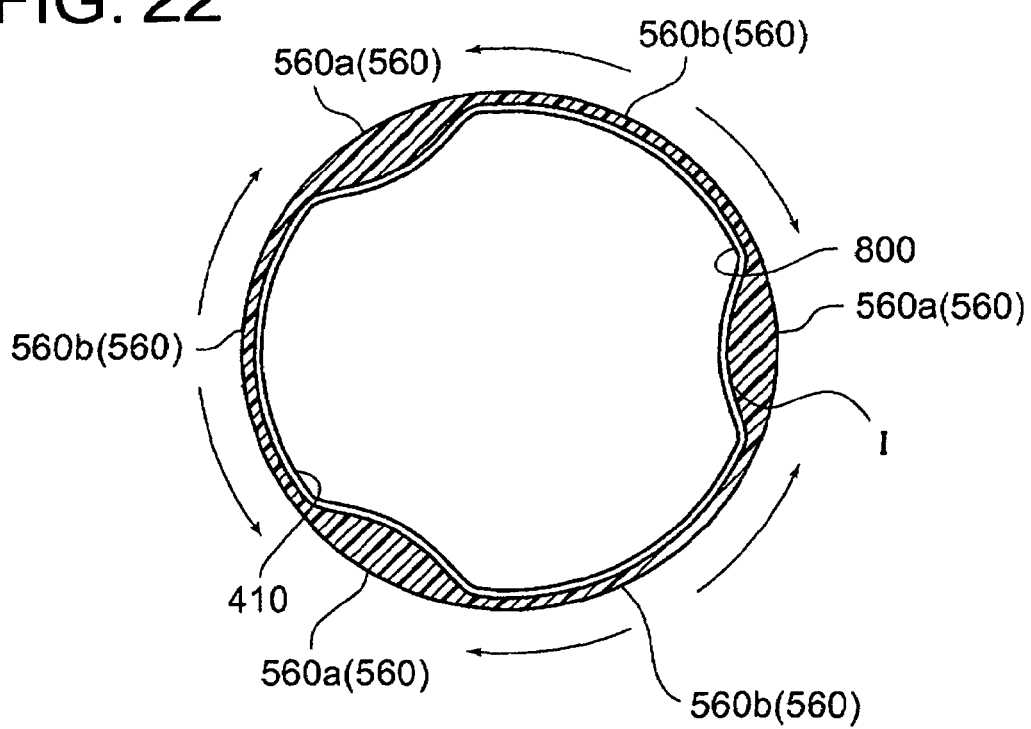
FIG. 22 is a simplified bottom view showing a form shown from the bottom side of the form in FIG. 21.

In accordance with the embodiment, the different thickness portion 560, as shown in FIG. 22, is constituted by three openings of the large thickness portion 560a and three openings of the small thickness portion 560b which are alternately formed continuously with a fixed intervals in the circumferential direction to the outer surface of the large diameter side end portion 410 of resin bellows 800 using a thermoplastic resin (for example, a polyester thermoplastic elastomer) 4a. The large thickness portion 560a is protruded in the vertical direction to the center of the large diameter side end portion 410 and is arranged in the circumferential direction at regular intervals. The small thickness portion 560b is arranged between the large thickness portion 560a and the diametrical thickness thereof is smaller than that of the large thickness portion 560a.

Further, in the present embodiment as the same as with the first embodiment, two non-penetrating holes (recess portions) are provided in an axial direction of the large thickness portion 560a, thereby intending to achieve a weight saving, a shrinkage prevention and an improvement of elasticity.

Next, a description will be given of one embodiment of a method of the manufacturing resin boots for constant velocity universal joint in accordance with the present invention.

[Resin Bellows Preparing Step]

As a method of molding the resin bellows 800 mentioned above, a blow molding, an injection blow molding and the like are well known, however, the method is not particularly limited, and an optimum bellows molding method is appropriately employed within the range of the present invention.

[Secondarily Molding Step]

The present step is a secondarily molding step of integrally molding the different thickness portion 560 corresponding to the secondarily molded product in the outer surface of the large diameter side end portion 410 of the bellows 800 by holding resin bellows 800, which is the primarily molded in accordance with the resin bellows preparing step, within the injection molding metal mold 640 (a split mold 650) and the core mold 700, and injecting a desired molten material into secondary molding space 690 formed between the outer surface of the large diameter side end portion 410 of the bellows 800 and the split mold 650, for example, a thermoplastic resin 4a having a high temperature equal to or more than 260° C. within the metal mold 640 at a high speed by opening the pin gate 79. A description will be given of one embodiment thereof. In this case, since the known structures are applied to the other structures than the structure described below, a description thereof will be omitted. In this case, the injected thermoplastic resin has the temperature equal to or more than 260° C., however, the resin is not particularly limited, and can be appropriately changed in design within the range in which the raw material is not changed.

Figure 19:
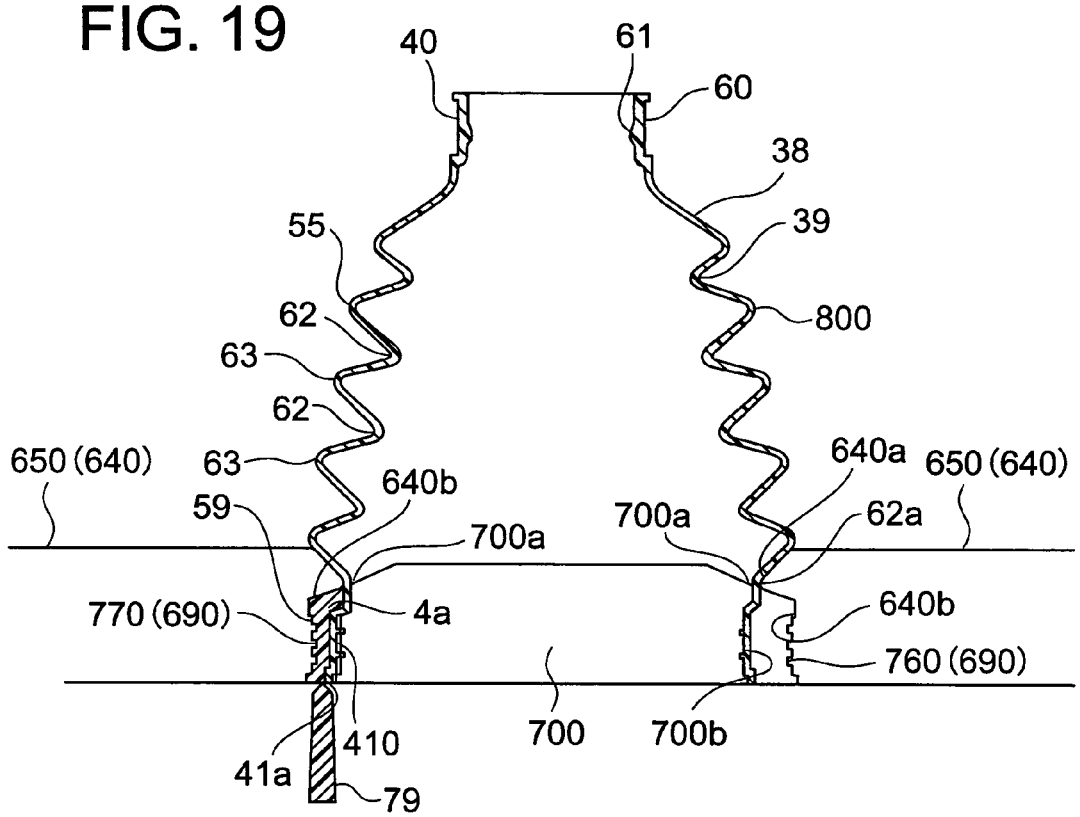
FIG. 19 is a cross-sectional view showing a resin boots for constant velocity universal joint in accordance with a second embodiment of the present invention in a simplified manner.
Figure 20:
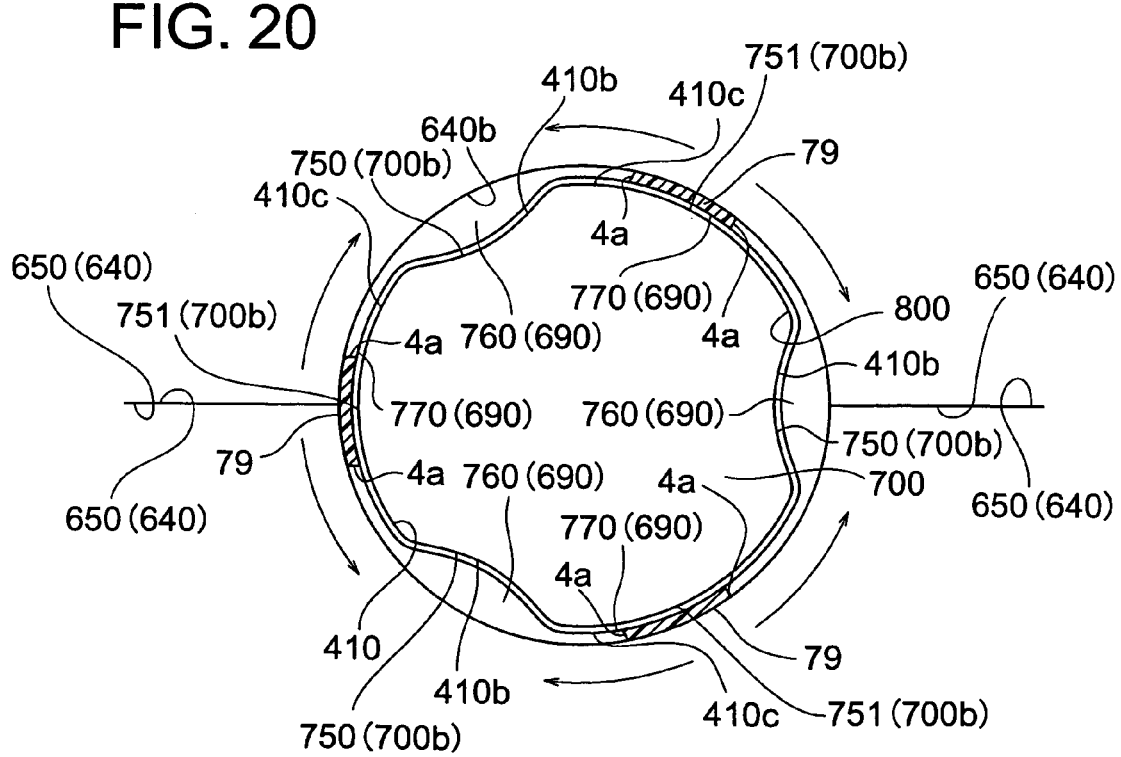
FIG. 20 is a simplified bottom view showing a form of the molten material, which is injected from the small thickness portion molding spaces, flowing to the opposite two sides of conical directions each directing the large thickness molding spaces.

First, by inserting a core mold 700 to the inner surface of the large diameter side end portion 410 of the primarily molded resin bellows 800 mentioned above, thereafter, a desired secondarily molding space 690 (large thickness portion molding space 760 and small thickness portion molding space 770) is formed continuously in a circumferential direction between the outer surface of the large diameter side end portion 410 of the resin bellows 800 and the split mold 650 (the first step, FIG. 19 and FIG. 20).

The injection molding metal mold 640 constituted of a desired split mold 650, and as shown in FIG. 19 and FIG. 20, is structured by an inner peripheral end portion 640a where at least the large diameter side end portion 410 of the resin bellows 800 close to the bellows valley portion 62a is fitted with an outer peripheral end portion 700a of the core mold 700 described below, when clamping the split mold 650, as well as by a recess-shaped surface portion 640b in a conical or an approximately conical-shape for forming fixed spaces (secondary molding space 690) in the outer surface of the large diameter side end portion 410 of the resin bellows 800.

The core mold 700 is inserted and arranged in the inner surface of the large diameter side end portion 410 of the resin bellows 800, including an outer peripheral end portion 700a exist in fitting the large diameter side end portion 410 of the resin bellows 800 close to the bellows valley portion 62a with the inner peripheral end portion 640a of the split mold 640, as well as a convex-recess surface portion 700b for being integrated to the inner surface of the large diameter side end portion 410 of the resin bellows 800.

The convex-recess surface portion 700b is referred to as an outer peripheral-shape of an outer case, outer peripheral-shape of an outer diameter and outer diameter of the tripod joint 80 to be subjected.

In the present embodiment, the convex-recess surface portion 700b is formed of three recess portions 750 with a fixed interval in the outer peripheral portion of the core mold 700.

As a result, when the core 700 is inserted into the inner surface of the large diameter side end portion 410 of the resin bellows 800, the convex-recess surface portion 700b of the core 700 coincides with the inner surface of the large diameter side end portion 410. Then, the large thickness portion molding space 760 is formed between the recess portion 410b of the large diameter side end portion 410 of the resin bellows 800, which coincides with the recess portion 750 of the convex-recess surface portion 770b, and the recess-shaped surface portion 640b of the split mold 650. Also, the small thickness portion molding space 770, which is connected to the large thickness portion molding space 760, is formed between the outer periphery 751 and the outer periphery other than the recess portion 750, and the surface portion 710c other than the recess portion 410b of the large diameter side end portion 410 of the resin bellows 800.

In this embodiment, the pin gate 79 that injects the thermoplastic resin 4a to the secondary molding space 690 is selectively provided in an approximately center in the circumferential direction to the small thickness portion molding space 770 (FIG. 20).

Further, the thermoplastic resin 4a is injected to each small thickness portion molding space 770, 770, 770 from an approximately center in the circumferential direction of the each small thickness portion molding space 770, 770, 770 in the secondary molding space 690, and from the pin gate 79, 79, 79 mounted on every small thickness portion molding space 770, 770, 770 (the second step, FIGS. 19 and 20).

Figure 21:
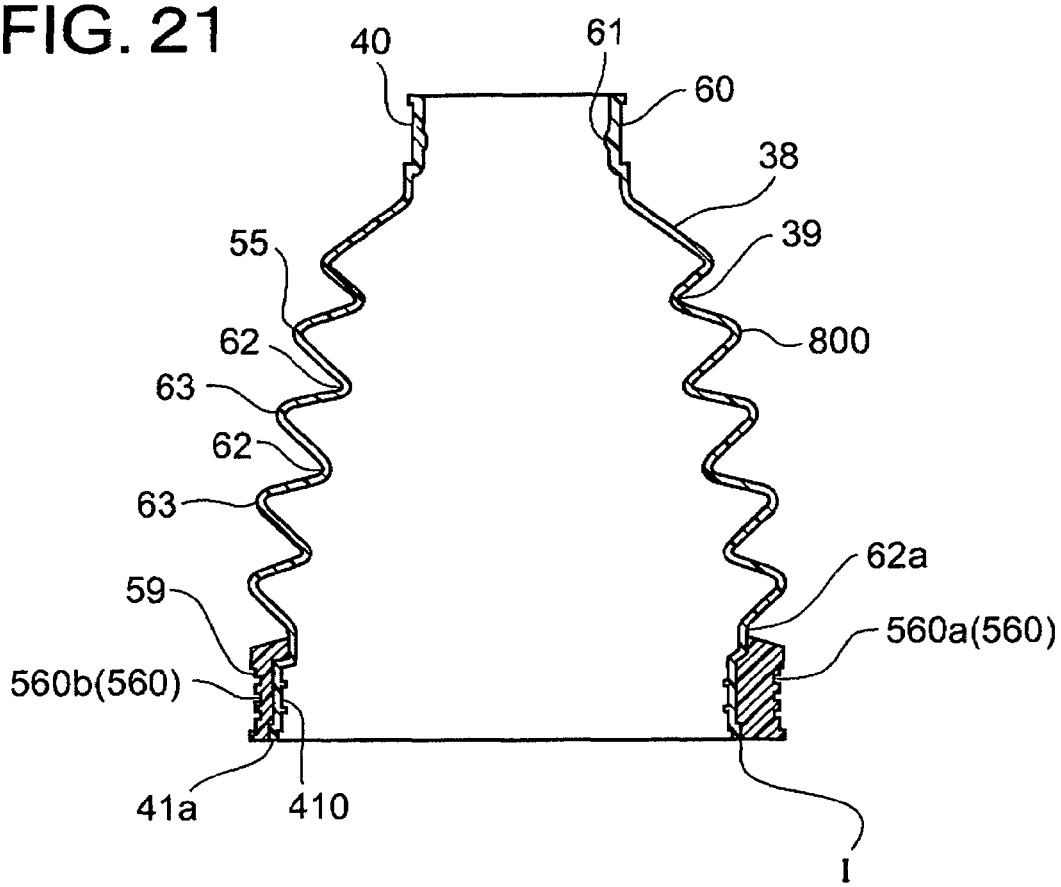
FIG. 21 is a cross-sectional view showing a form a secondary molding part being welded and integrated into the outer surface of the large diameter side end portion of the resin bellows in accordance with the second embodiment.

As mentioned above, as for the thermoplastic resin 4a injected from the pin gate 79 constituted on the approximately center in the circumferential direction of each small thickness portion molding space 770, the small thickness portion molding space (small space in the interval in the diametrical direction) 770 to the large thickness portion molding space (large space in the interval in the diametrical direction) 760 doubles as a part of a runner, and the thermoplastic resin 4a is fed to the large thickness portion molding space 760 in a split second with a high speed and a high temperature while maintaining a high temperature state, so that a weld or an air involving is not absolutely generated, and the outer surface of the bellows large diameter side end portion 410, and the large thickness portion 560a and the small thickness portion 560b formed by the secondary molding are completely welded and integrated (the third step, FIGS. 21 and 22).

Particularly, in the present embodiment, for example, it is assumed of the case where there are three large thickness portion molding spaces 760 and three small thickness portion molding space 770 therebetween, and the thermoplastic resin 4a is injected from each pin gate 79 constituted on the approximately center in the circumferential direction of each of the mentioned small thickness portion molding space 770 (FIG. 19 and FIG. 20).

The thermoplastic resin 4a injected from the pin gate 79 constituted on the approximately center in the circumferential direction of each small thickness portion molding space 770, is immediately flown in six flows of which divided into two opposite conical directions individually, whereby the thermoplastic resin 4a becomes a laminar flow which runs to the direction of each large thickness portion molding space 760 at high speed while maintaining high temperature (FIG. 20). Arrows in each Figure represents the flow of each thermoplastic resin 4a.

That is, the thermoplastic resin 4a injected from the pin gate 79 constituted on the approximately center in the circumferential direction of each small thickness portion molding space 770, runs in six flows so as to be brought into slidable contact with the outer surface of the large diameter side end portion 410 of the resin bellows 8, whereby the temperature of the outer surface of the large diameter side end portion 410 is elevated near to that of the thermoplastic resin 4a for secondary molding, and is melted.

Next, the two opposite flows of the like of the six flows are immediately released into the large thickness portion molding space 760 as to collide as being a turbulent flow, and two of the flows are mixed in complex to a sing flow.

Such interflow of the thermoplastic resins 4a is generated at three large thickness portion molding spaces 760 simultaneously.

As described above, the thermoplastic resin 4a is charged in every corner of the secondary molding space 690 (large thickness portion molding space 760 and small thickness portion molding space 770).

As a result, there is hardly any contact portion (weld) or shrink mark, and the outer surface of the large diameter side end portion (primary molding portion) 410 of the resin bellows 800 and the secondary molding portion (each large thickness portion 560a and small thickness portion 560b) are completely welded and integrated (I; FIGS. 21 and 22).

Further, in order to improve adhesiveness between the outer surface of the large diameter side end portion 410 and the different thickness portion 560 (large thickness portion 560a and small thickness portion 560b) corresponding to the secondarily molded product, the convex-recess portions, not shown, formed continuously in the circumferential direction with components constituted alternately can be also adopted. Moreover, the convex portion doubles as a part of the dam, whereby functions to flow the thermoplastic resin 4a injected to the small thickness portion molding space 770 from the pin gate 79 from the small thickness portion molding space 770 to the large thickness portion molding space 760 uniformly. Also, the convex-recess portions mentioned above are the same components and the functional effects as with the recess portion 57 and the convex portion 58 constituted in the inner surface of the large diameter side end portion 41 in the first embodiment.

Further, in accordance with the present embodiment, to have no fear of grease leakage in the boots, it is better to position the pin gate 79 in the large thickness portion molding space 760 rather than the small thickness portion molding space 770.

Other conditions or the like may be set in accordance with the first embodiment mentioned above.

Further, it is possible to further firmly weld the resin bellows 800 corresponding to the primarily molded product to the different thickness portion 560 corresponding to the secondarily molded product by setting the injection condition of the thermoplastic resin 4a into the secondary molding space 690 as follows.

That is, a direction of the injection pin gate 79 is set under a condition $0° \leq \theta \leq 90°$, with respect to the outer surface of the large diameter side end portion 410 of the resin bellows 800, a position condition of the injection pin gate 79 is set to a condition $0 \leq t \leq 2a/3$ in which a distance between the outer surface of the large diameter side end portion 410 of the resin bellows 800 and the injection pin gate 79 is set to t, and a diametrical distance of the injection side end portion of the secondary molding space 690 is set to a.

Accordingly, the high temperature thermoplastic resin 4a is injected so as to be brought into slidable contact with the outer surface of the large diameter side end portion 410 of the resin bellows 800, and the thermoplastic resin 4a is charged into the secondary molding space 690.

At this time, since the injected high temperature thermoplastic resin 4a flows so as to be brought into slidable contact with the outer surface of the large diameter side end portion 410 at a high speed, impurities attached on the surface of the outer periphery of the large diameter side end portion 410 are washed out, and a heat of the thermoplastic resin 4a flowing at the high temperature and high speed is transmitted to the surface of the outer periphery, thereby melting the surface. Therefore, the injected thermoplastic resin 4a is firmly welded to the surface of the large diameter side end portion 410 which is melted by the heat of the thermoplastic resin 4a, and the different thickness portion 560 is integrally molded in the outer surface of the large diameter side end portion 410 in accordance with the secondary molding.

The invention claimed is:

1. A resin boot for constant velocity universal joint, comprising:
    a resin bellows including an approximately conical bellows-shaped portion with an inner hollow space, a small diameter side end portion communicated with the inner space of the bellows-shaped portion and arranged at one end thereof, and a large diameter side end portion communicated with the inner space of the bellows-shaped portion and arranged at the other end thereof;
    a different thickness portion including a plurality of large thickness portions protruded toward a central axis of the large diameter side end portion and arranged in a circumferential direction at approximately regular intervals and a plurality of small thickness portions, each arranged between the adjacent plurality of large thickness portions and formed thinner in a diametrical direction than the large thickness portions, and formed such that the plurality of large thickness portions and the plurality of small thickness portions are continuously formed in the circumferential direction; and
    an integrally welded portion between an inner surface of the large diameter side end portion of the resin bellows and the different thickness portion,
    wherein a different thickness portion is welded and integrated with the inner surface of the large diameter side end portion of the resin bellows by injection molding, whereby the integrally welded portion is formed.

2. The resin boot for constant velocity universal joint according to claim 1,
    wherein a small thickness portion molding space and a large thickness portion molding space are formed in the inner surface of the large diameter side end portion of the resin bellows, and
    wherein a molten material is injected into the small thickness portion molding space and the large thickness portion and the small thickness portion are welded and integrated with the inner surface of the large diameter side end portion.

3. The resin boot for constant velocity universal joint according to claim 2, wherein the molten material is injected into an approximate center in the circumferential direction of the small thickness portion molding space.

* * * * *